United States Patent
Kelly et al.

(10) Patent No.: US 9,972,318 B1
(45) Date of Patent: May 15, 2018

(54) INTERPRETING VOICE COMMANDS

(71) Applicant: Amazon Technologies, Inc., Seattle, WA (US)

(72) Inventors: Eric Kelly, Seattle, WA (US); Kevin Utter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/271,758

(22) Filed: Sep. 21, 2016

(51) Int. Cl.
*G10L 15/00* (2013.01)
*G10L 15/22* (2006.01)
*G10L 15/08* (2006.01)
*G10L 15/30* (2013.01)
*G10L 15/26* (2006.01)

(52) U.S. Cl.
CPC ............ *G10L 15/222* (2013.01); *G10L 15/08* (2013.01); *G10L 15/265* (2013.01); *G10L 15/30* (2013.01); *G10L 15/22* (2013.01); *G10L 2015/088* (2013.01); *G10L 2015/223* (2013.01)

(58) Field of Classification Search
CPC combination set(s) only.
See application file for complete search history.

*Primary Examiner* — Vu B Hang
(74) *Attorney, Agent, or Firm* — Pierce Atwood LLP

(57) ABSTRACT

A system capable of generating and storing progress data associated with third party services. A voice enabled device may receive voice commands and the system may perform natural language understanding (NLU) to interpret the voice commands, determine a corresponding process and send instructions to a third party server associated with the process. In order to resume the process after the process is interrupted, the system may save and/or cause the third party server to save progress data and/or a checkpoint corresponding to a status of the process at the time that the process is interrupted. The system may use the progress data to resume the process at a later point based on the status. In addition, the system may track processes associated with saved progress data/checkpoints and may interpret incoming voice commands based on the tracked processes.

20 Claims, 20 Drawing Sheets

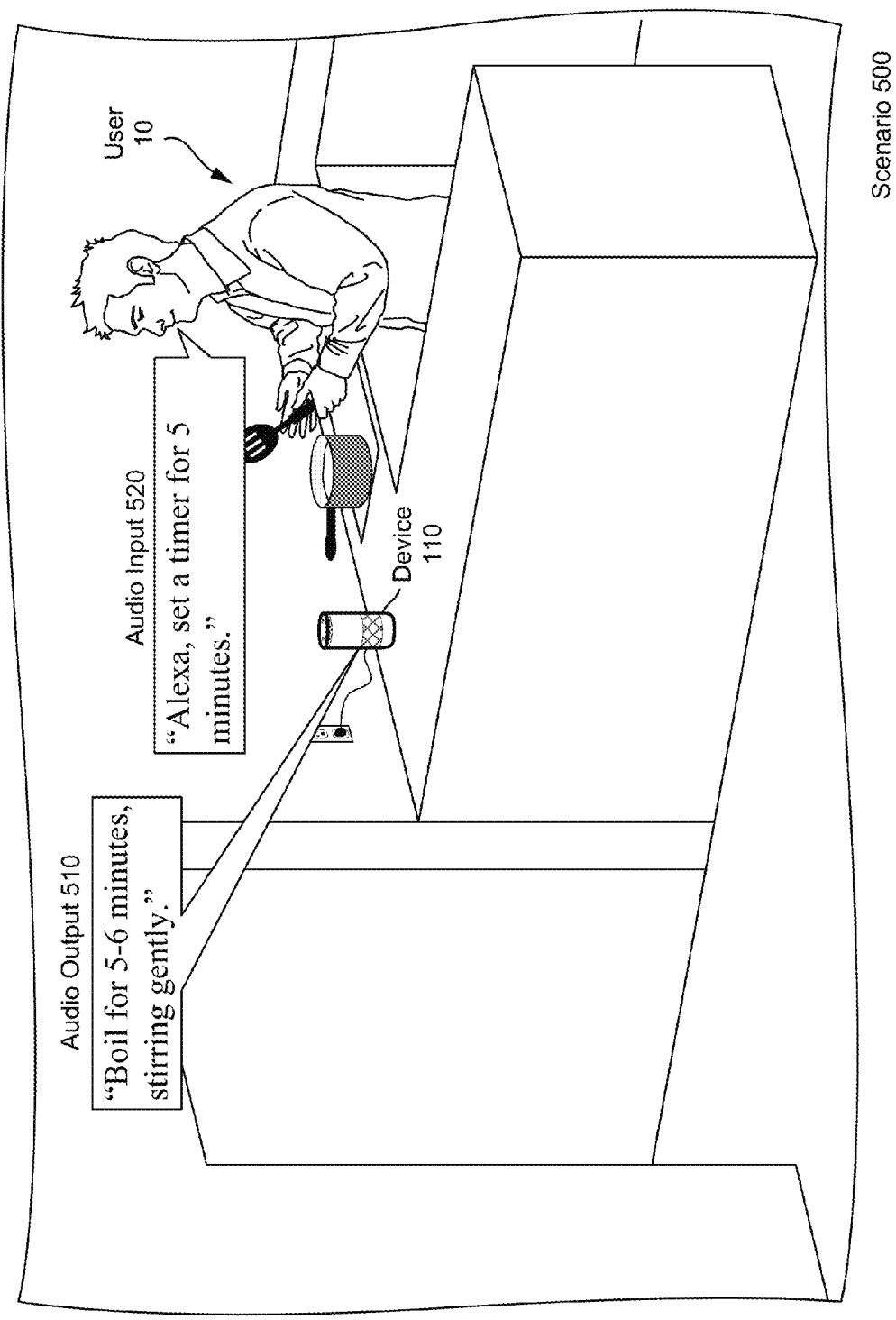

FIG. 7

| Process ID | Checkpoint |
|---|---|
| | |
| | |
| | |

Association Table 710

| Process ID | Reference Location |
|---|---|
| | |
| | |
| | |

Association Table 712

| Process ID | Total Progress Data |
|---|---|
| | |
| | |
| | |

Association Table 714

| Process ID | Name | Task | Task Type | Session ID | Expiration | Progress Data |
|---|---|---|---|---|---|---|
| | | | | | | |
| | | | | | | |
| | | | | | | |

Association Table 720

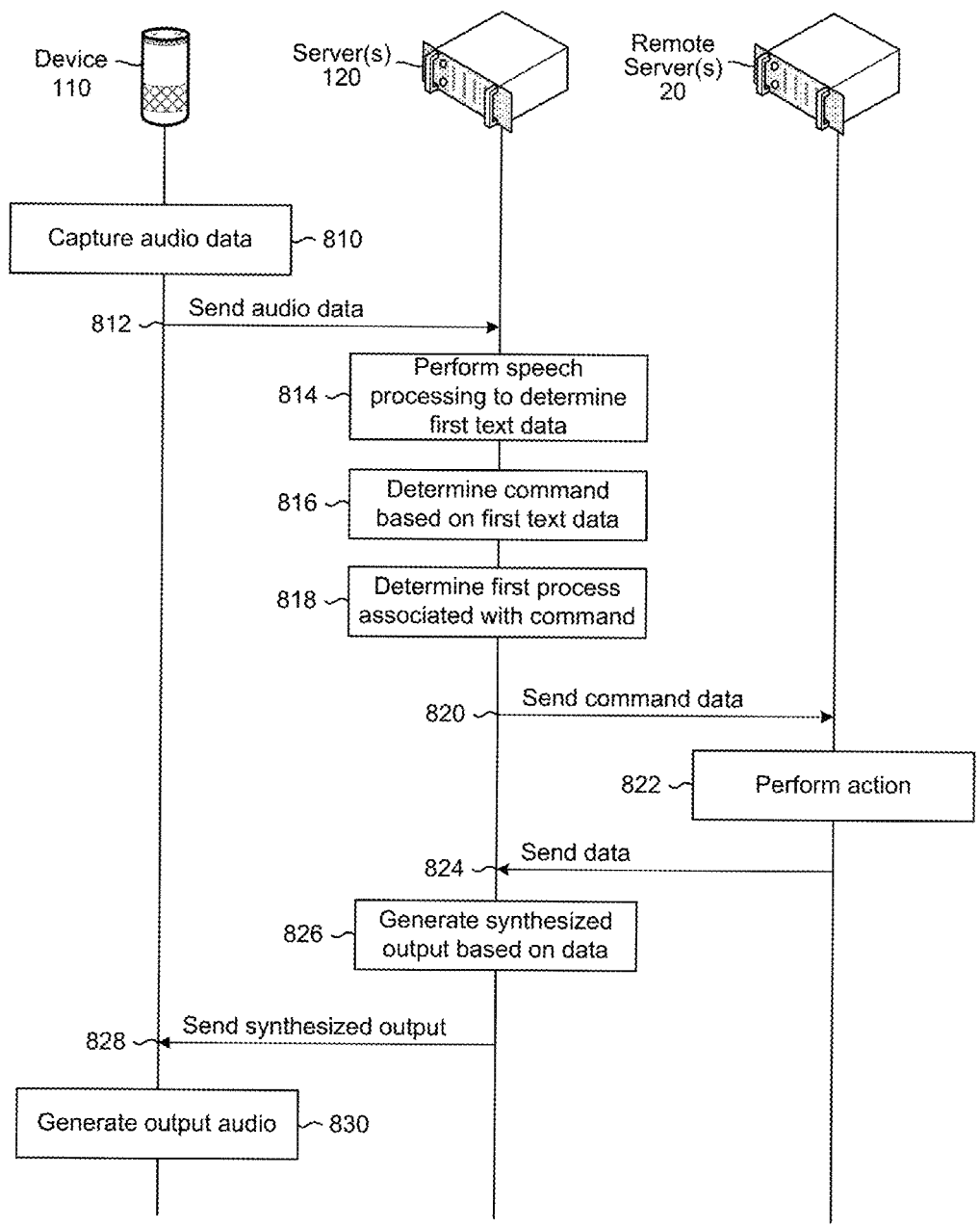

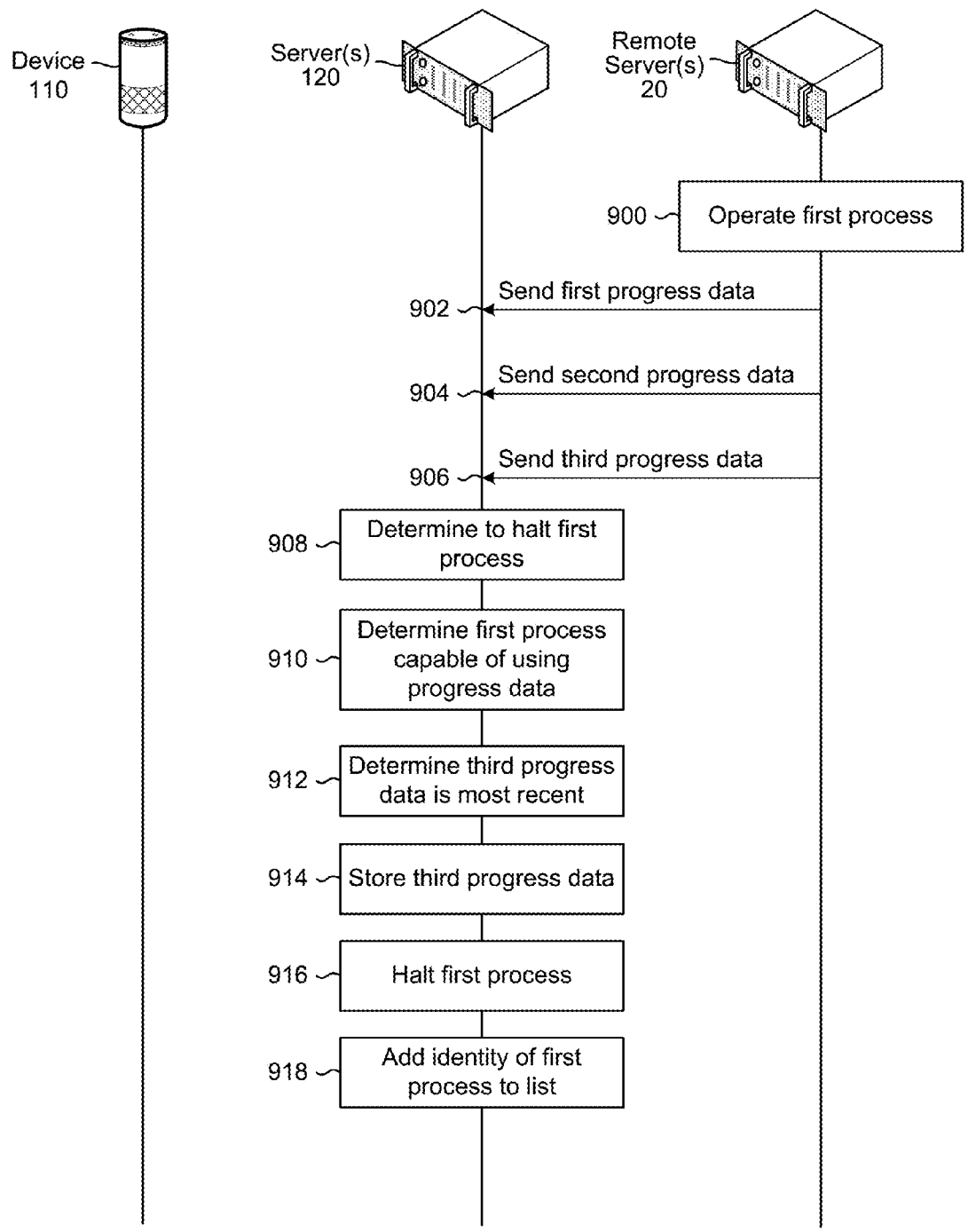

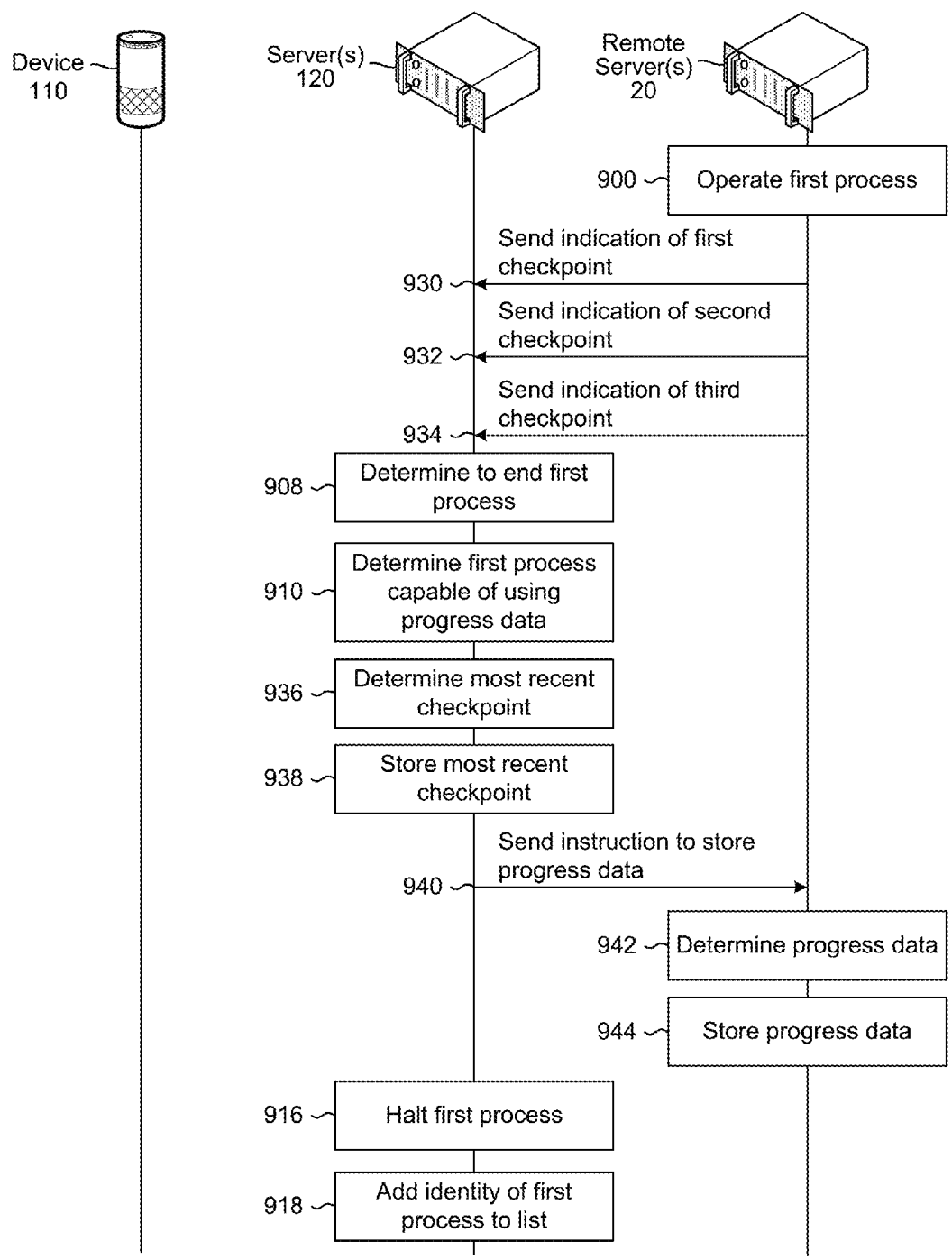

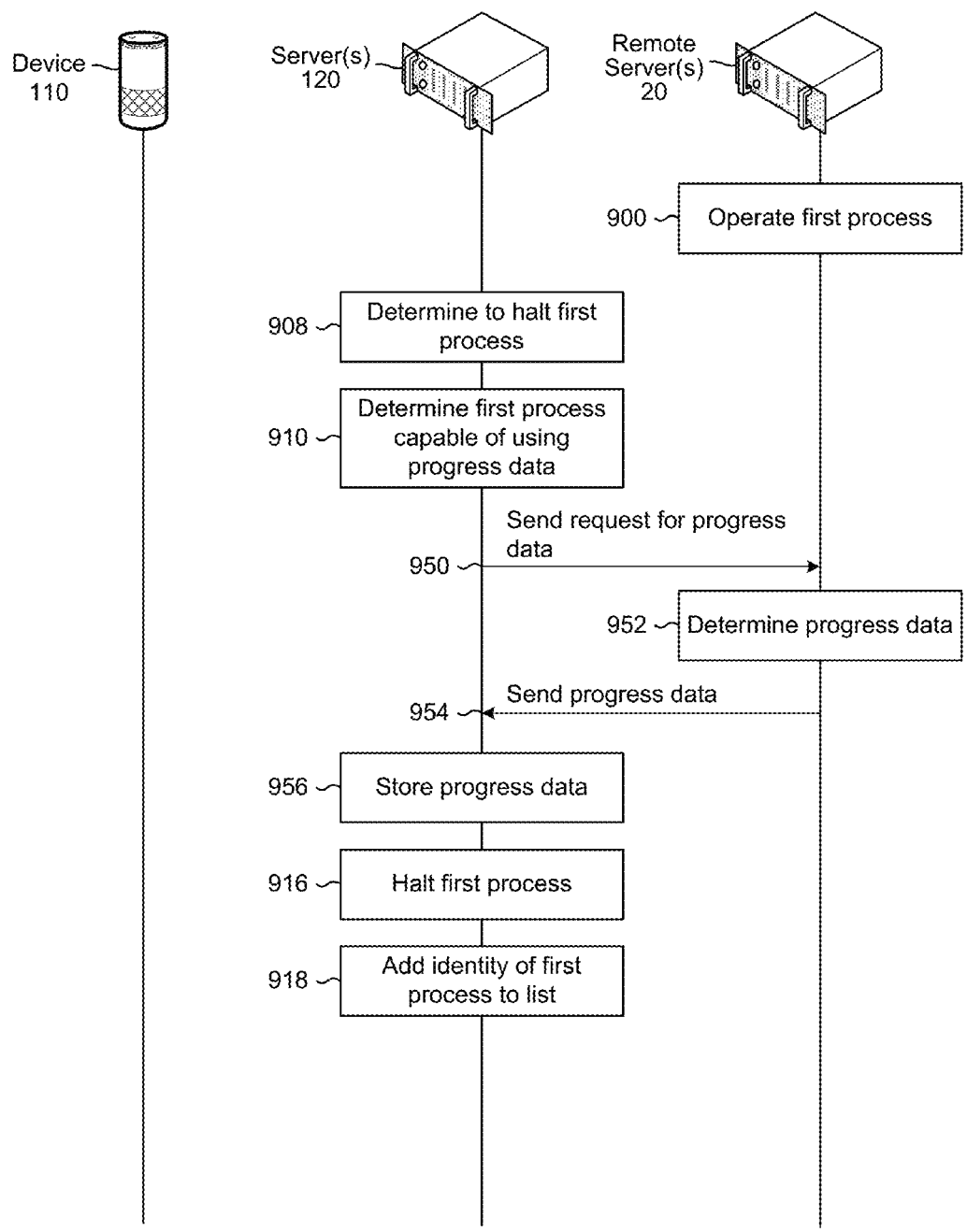

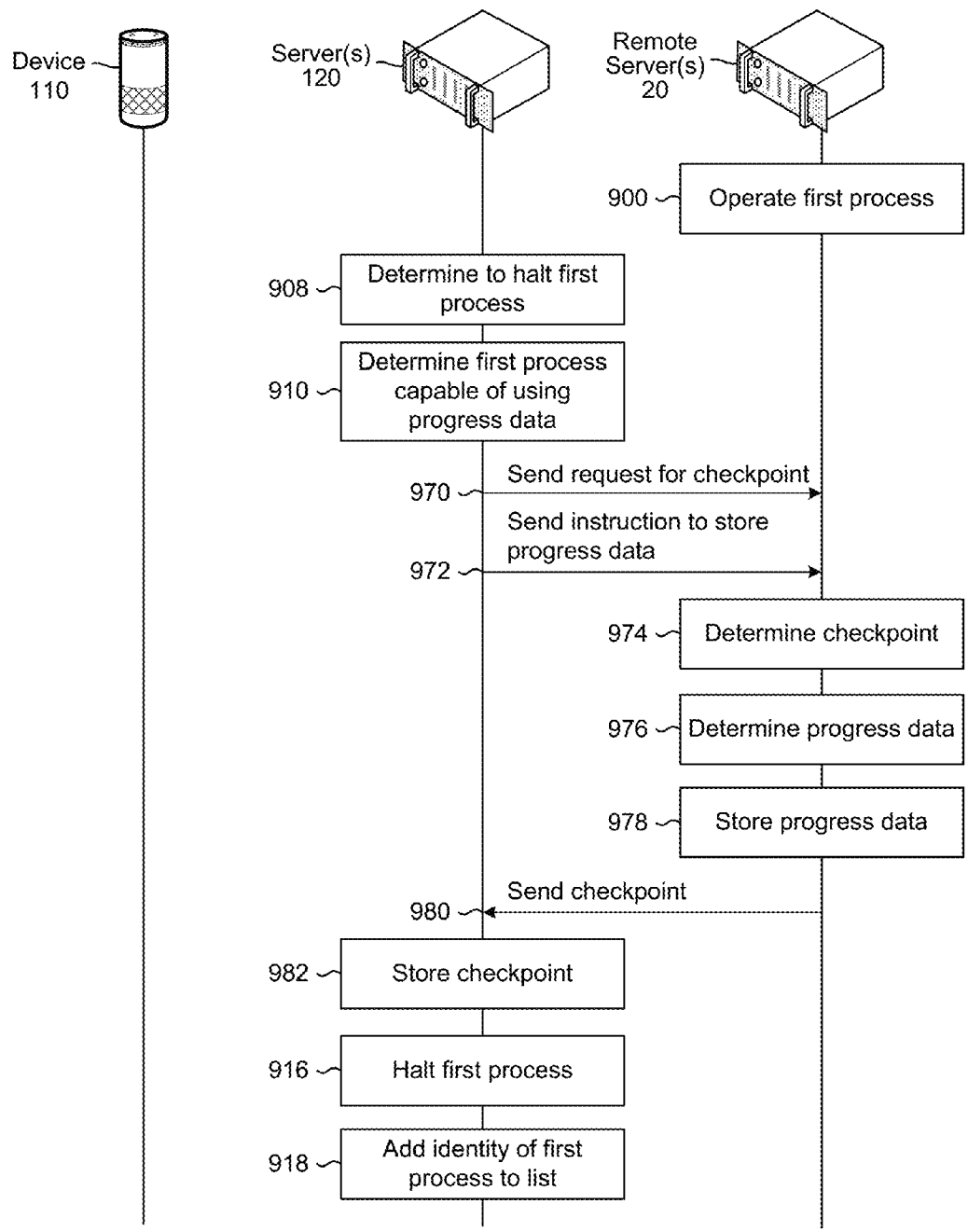

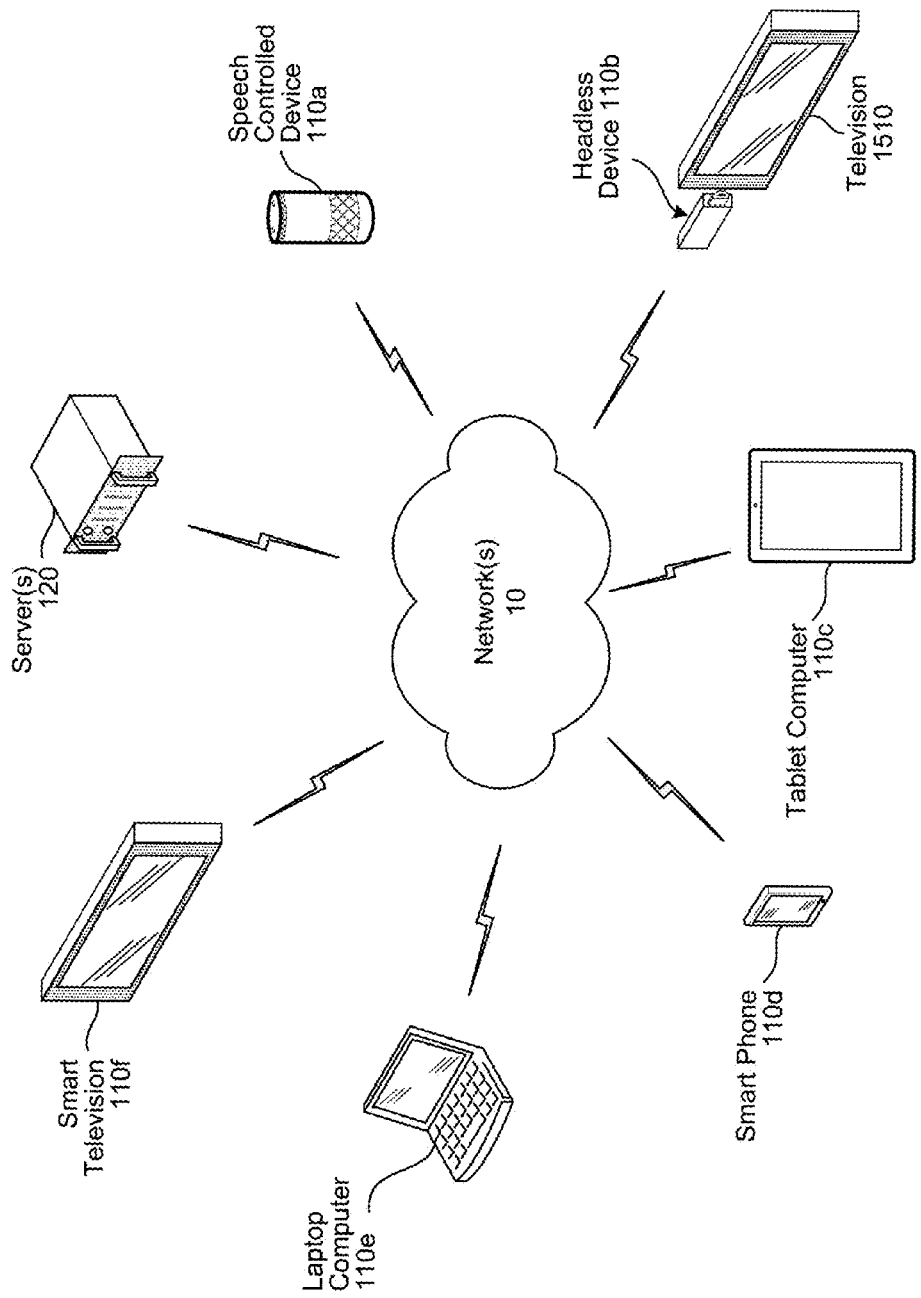

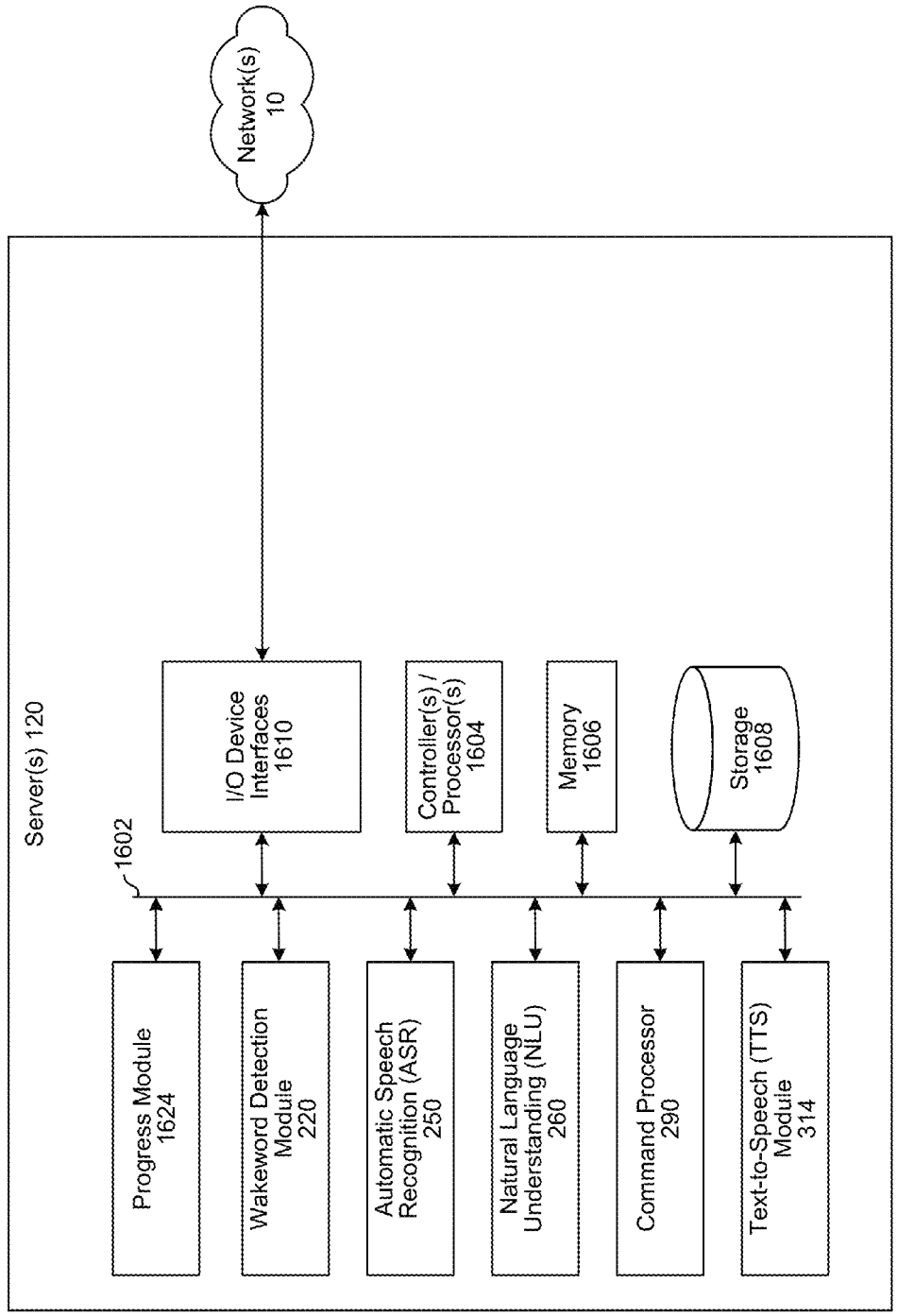

INTERPRETING VOICE COMMANDS

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions. Devices are commonly used to switch between multiple processes to perform different tasks. Disclosed herein are technical solutions to improve a user experience when switching between different processes.

BRIEF DESCRIPTION OF DRAWINGS

For a more complete understanding of the present disclosure, reference is now made to the following description taken in conjunction with the accompanying drawings.

FIG. 5 illustrates an example of customer interaction according to embodiments of the present disclosure.

FIG. 7 illustrates examples of association tables according to embodiments of the present disclosure.

FIG. 8 is a communication diagram conceptually illustrating operating a process according to embodiments of the present disclosure.

FIGS. 9A-9D are communication diagrams conceptually illustrating examples of storing progress data according to embodiments of the present disclosure.

FIG. 15 illustrates an example of a computer network for use with the system.

FIGS. 16A-16B are block diagrams conceptually illustrating example components of a system for echo cancellation according to embodiments of the present disclosure.

DETAILED DESCRIPTION

Figure 1:
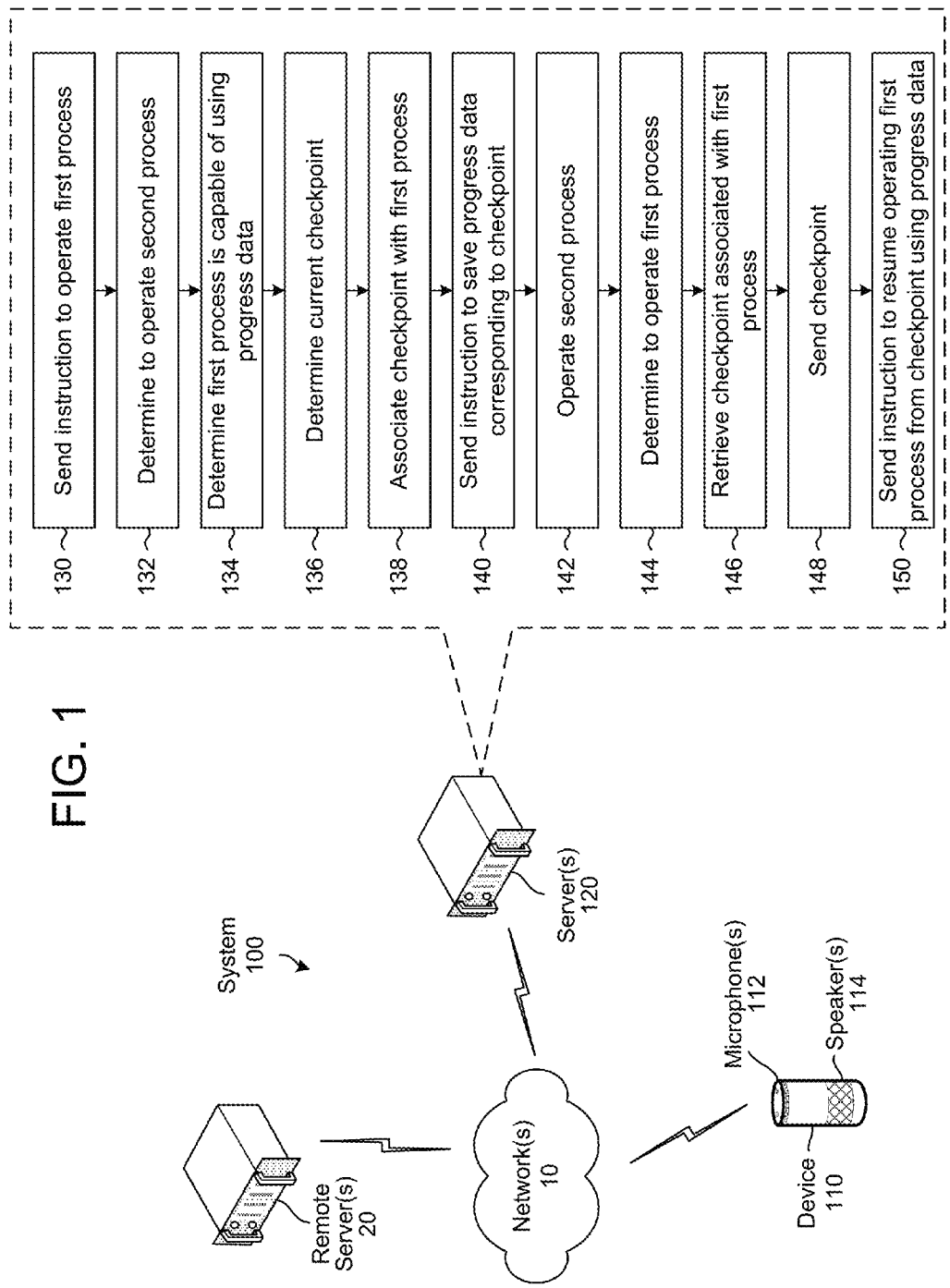
FIG. 1 illustrates a system according to embodiments of the present disclosure.

Automatic speech recognition (ASR) is a field of computer science, artificial intelligence, and linguistics concerned with transforming audio data associated with speech into text data representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used when performing speech processing. A typical such distributed environment may involve a local device having one or more microphones being configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

As part of the speech processing, the command may be associated with a process (e.g., application or program configured to execute a command to satisfy the utterance). Some processes (e.g., first party processes) run on local servers that may have more direct access to the speech processing systems. As a result, the local servers can halt a first process at a first time (e.g., T1) and resume the first process at a second time (e.g., T2) as the local servers can store data associated with the first process at the first time in a manner coordinated with other aspects of the speech processing system. However, other processes (e.g., third party processes) that may be run in response to certain utterances may run on remote servers and therefore the local servers do not have access to memory states associated with the processes. As a result, when a process that relies on a remote server is interrupted or ended, the session ends and a subsequent voice command invoking the second process results in a new session starting at a beginning without regard to the previous session. Thus it may be more difficult to use voice commands to resume processes that rely on such remote servers.

To improve system performance and enable a speech processing system to resume third party processes, offered is a natural language processing system that generates and stores progress data associated with a current status of a third party process. The progress data may include a memory state associated with the third party process (e.g., total progress data), a reference location or other pointer corresponding to the total progress data, a checkpoint (e.g., current step in a series of steps) used to determine the total progress data, and/or the like. The system may store the total progress data locally or may store checkpoint(s) and/or reference location(s) locally that correspond to total progress data stored on a remote server associated with the third party process. Thus, the system may resume the third party process by sending the total progress data to the remote server, by sending the checkpoint(s) and/or reference location(s) to the remote server or by sending other information (e.g., user identification) that enables the remote server to retrieve the progress data. In some examples, the system may dynamically determine when to save the progress data based on user preferences and/or a current progress of the third party process.

Additionally or alternatively, the system may interpret a voice command based on a list of processes that are associated with progress data. For example, when the system halts a first process (e.g., a cookbook application), the system 100 may store progress data associated with the first process along with additional data (e.g., keywords associated with the first process, current state of the first process, identification of the first process, a human-readable name associated with the first process, a task and/or task type, a session identification, an expiration date associated with the progress data or the like) and may add the first process to the list of processes. When receiving a voice command (e.g., "resume the recipe"), the system may identify a command associated with the list of processes (e.g., "resume"), determine that the first process is included in the list of processes, may identify the first process (e.g., using keywords such as "recipe") and may resume the first process using the progress data.

In some examples, the system may determine whether to restart the process from a beginning or to resume from a previous session using the progress data based on different voice commands. For example, a first voice command (e.g., "start recipes," "restart recipes," "begin recipes," etc.) may restart the process (e.g., begin a new session without the progress data) and a second voice command (e.g., "resume recipes," "continue recipes," etc.) may resume the process (e.g., resume the previous session using the progress data). Additionally or alternatively, the user may explicitly request that the system store progress data for a process (e.g., "store progress," "save checkpoint," "save for later," etc.) and/or delete stored progress data (e.g., "delete progress," "discard checkpoint," etc.).

FIG. 1 illustrates a high-level conceptual block diagram of a system 100 configured to perform Natural Language Understanding (NLU) processing. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include remote server(s) 20 and server(s) 120 communicatively coupled to a device 110 via network(s) 10. The device 110 may include microphone(s) 112 and/or speakers 114. Using the microphone(s) 112, the device 110 may capture audio data and send the audio data to the server(s) 120 to determine a voice command. For example, the server(s) 120 may perform Automatic Speech Recognition (ASR) processing, Natural Language Understanding (NLU) processing and/or command processing to determine the voice command.

While the examples described herein illustrate the server(s) 120 performing multiple functions, the disclosure is not limited thereto. Instead, the device 110 may perform any of the functions described herein without departing from the disclosure. For example, the server(s) 120 may assist the device 110 with Automatic Speech Recognition (ASR) processing, Natural Language Understanding (NLU) processing, command processing, generating progress data, saving progress data and/or generating synthesized speech. A single server 120 may be capable of performing all speech processing or multiple server(s) 120 may combine to perform the speech processing. In addition, certain speech detection or command execution functions may be performed by device 110. Thus, the device 110 and/or the server(s) 120 may perform the functions described herein without departing from the disclosure.

The voice command instructs the system 100 what the user would like to do. For example, the user may request information (e.g., "what is the capital of France?"), may request that the server(s) 120 perform an action using a first party process (e.g., "set a timer for 5 minutes" or "play the latest album by Adele") and/or ask that the server(s) 120 perform an action using a third party process using the remote server(s) 20 (e.g., "order a pizza from Dominos" or "check my account balance"). Based on the voice command, the server(s) 120 may send an instruction (e.g., request) and/or data to the remote server(s) 20, receive data and/or a query from the remote server(s) 20, perform an action/execute the voice command on the server(s) 120, send an instruction to the device 110 to perform an action/execute the voice command, send data to the device 110 and/or generate synthesized speech and send the synthesized speech to the device 110. Using the speakers 114, the device 110 may output the synthesized speech to the user.

While the example illustrated above includes the server(s) 120 sending an instruction and/or data to the remote server(s) 20, the disclosure is not limited thereto. Instead, the server(s) 120 may operate a process (e.g., locally execute commands associated with the process) that is associated with the remote server(s) 20 and/or retrieve program code associated with the process without departing from the disclosure. Thus, while the examples described herein illustrate the remote server(s) 20 performing multiple functions, the disclosure is not limited thereto and the server(s) 120 and/or the remote server(s) 20 may perform any of the functions described herein without departing from the disclosure.

As used herein, a first party process is a process (e.g., application, program, or portion thereof) that runs on the server(s) 120 and the server(s) 120 therefore has access to the memory state associated with the process. For example, the server(s) 120 stores data associated with the process and can pause and resume functionality based on the stored data. During operation of a first party process, the server(s) 120 may receive audio data from the device 110, perform ASR, NLU and command processing to determine a voice command included in the audio data, perform an action based on the voice command, generate synthesized speech corresponding to the action and send the synthesized speech to the device 110 to be output to the user.

As used herein, a third party process is a process that runs (at least in part) on the remote server(s) 20 and therefore the server(s) 120 may not have access to the memory state associated with the process. Instead, the server(s) 120 has access to a portion of the data associated with the process as the server(s) 120 acts as an intermediary between the device 110 and the remote server(s) 20. During operation of a third party process, the server(s) 120 may receive audio data from the device 110, perform ASR, NLU and command processing to determine a voice command included in the audio data, send data and/or an instruction (e.g., request) to the remote server(s) 20, receive data from the remote server(s) 20, generate synthesized speech corresponding to the data and/or the instruction and send the synthesized speech to the device 110 to be output to the user. As the server(s) 120 only have a portion of the data associated with the process, the server(s) 120 are unable to pause and resume functionality associated with the third party process. Thus, when the third party process is interrupted (e.g., the device 110 determines that no input has been received for a period of time, the user inputs a second voice command to end the third party process and/or operate a different process, etc.), the server(s) 120 ends the session, the remote server(s) 20 discards data associated with the session and the server(s) 120 are unable to resume the third party process from the previous session. Instead, a subsequent voice command invoking the third party process results in a new session starting at the beginning.

In order to enable the system 100 to resume functionality of third party processes, the system 100 may store progress data associated with a current status of the third party process (e.g., current session). The progress data may include a memory state associated with the third party process (e.g., total progress data), a reference location or other pointer corresponding to the total progress data, a checkpoint (e.g., current step in a series of steps) used to determine the total progress data, or the like. The progress data may be stored on the server(s) 120, the remote server(s) 20 and/or an independent storage device. The independent storage device may be online storage associated with the server(s) 120, associated with the remote server(s) 20 and/or independent from the system 100. For ease of explanation, the disclosure may refer to the server(s) 120 storing the progress data when the system 100 stores the progress data (or causes the progress data to be stored) on the independent storage device. For example, while the following description may refer to the remote server(s) 20 sending the progress data to the server(s) 120 and the server(s) 120 storing the progress data, the remote server(s) 20 may send the progress data to the independent storage device without departing from the disclosure.

In some examples, the system 100 may store (or cause to be stored) a majority of the progress data (e.g., total progress data) on the independent storage device while storing portions of the progress data (e.g., reference location, identifier or checkpoint) on the server(s) 120 and/or the remote server(s) 20. In order to resume the third party process, the server(s) 120 may send the reference location/identifier/checkpoint to the remote server(s) 20 with an instruction to the remote server(s) 20 to retrieve the progress data from the independent storage device and to resume the previous session. In some examples, the system 100 may store portions of the progress data on the server(s) 120 (e.g., reference location or checkpoint) and the remote server(s) 20 (e.g., total progress data), and to resume the third party process the server(s) 120 may send the reference location/checkpoint to the remote server(s) 20 with an instruction to the remote server(s) 20 to load the total progress data and resume the previous session. In other examples, the system 100 may store the progress data (e.g., total progress data) on the server(s) 120 and to resume the third party process the server(s) 120 may send the total progress data to the remote server(s) 20.

As discussed above, while the examples described herein illustrate the remote server(s) 20 performing multiple functions, the disclosure is not limited thereto and the server(s) 120 and/or the remote server(s) 20 may perform any of the functions described herein without departing from the disclosure. Thus, the server(s) 120 may perform any and/or all of the functions described herein with regard to the remote server(s) 20. In some examples, the server(s) 120 may generate progress data and may send the progress data to the remote server(s) 20 and/or the independent storage device to be stored. Thus, the remote server(s) 20 and/or the independent storage device may retain the progress data and to resume the third party process the server(s) 120 may send an instruction to the remote server(s) 20 to retrieve the progress data from the remote server(s) 20 and/or the independent storage device and to resume the previous session.

In some examples, a third party process may be running for only a short period of time, such as from when the server(s) 120 sends input data to the remote server(s) 20 until the remote server(s) 20 sends output data to the server(s) 120. For example, the remote server(s) 20 may receive the input data, the process may run to perform a series of steps and send output data to the server(s) 120 and then the process may stop running. For ease of explanation, the present disclosure may refer to the process as running during a sequence of interactions with the process, even though the process may alternate between actively running and being idle. For example, the disclosure may refer to the process as running from when the system 100 receives a voice command (e.g., device 110 receives input audio data) until the system 100 generates an output (e.g., device 110 generates output audio data, such as a synthesized output).

Additionally or alternatively, the present disclosure may refer to the process as running during an ongoing exchange (e.g., series of voice commands) with the process, such as from when the system 100 receives a first voice command to when the system 100 generates a final output, including time between voice commands when the process is idle and waiting for input from a user. The ongoing exchange may be referred to as a current session and the system 100 may retain progress data associated with the current session from when the system 100 receives the first voice command until the system 100 generates the final output.

To illustrate an example, the user may interact with the system 100 to request a recipe from a first process. The first process may read the recipe to the user during a multi-turn session requiring input from the user followed by output from the first process. For example, the system 100 may receive a first voice command from the user, send a first user spoken intent corresponding to the first voice command to the first process (e.g., the remote server(s) 20), the first process may indicate that the first process is on step two, generate first output associated with step two of the recipe and then end, and the system 100 may output the first output (e.g., play synthesized speech reading step two of the recipe) to the user. Later, the system 100 may receive a second voice command from the user, send a second user spoken intent corresponding to the second voice command to the first process, the first process may indicate that the first process is on step three, generate second output associated with step three of the recipe and then end, and the system 100 may output the second output (e.g., play synthesized speech reading step three of the recipe) to the user.

Thus, after the first process generates the first output the first process ends, but in response to the second voice command the first process continues the current exchange. In some examples, the system 100 may use session data (e.g., session cookie) to track progress during a multi-turn exchange. The ongoing exchange (e.g., current session) may end when the system 100 receives a voice command starting a new session associated with the process, receives a voice command associated with a different process, determines that a timeout occurred (e.g., no input for a period of time, such as 8 seconds), and/or the like.

For ease of explanation, the present disclosure may refer to the system 100 halting a process (e.g., interrupting a process, starting a new process or the like) to describe halting a current session associated with the process (e.g., pausing the session). For example, as discussed above, each voice command received by the device 110 may be associated with a discrete sequence of steps, from capturing audio input to generating audio output, and the process may stop upon completion of the sequence of steps (e.g., after generating the audio output). Thus, when the system 100 receives a subsequent voice command associated with the process, the process has already stopped and the system 100 determines whether to resume the process from the previous sequence of steps (e.g., resume the current session) or to restart the process from a beginning (e.g., start a new session). Therefore, the system 100 does not actually halt the process, as the process has already stopped, but instead halts the current session and stores the progress data associated with the current session so that the session may be resumed upon a later invocation of the process.

Similarly, the present disclosure may refer to the system 100 ending a process to describe ending a current session associated with the process (e.g., without storing progress data). As discussed above, the system 100 does not actually end the process, as the process has already stopped, but instead starts a new session associated with the process and/or a different process without storing the progress data associated with the current session. Thus, subsequent voice commands invoking the process will start a new session from a beginning instead of resuming the previous session based on the progress data.

To illustrate the difference, the system 100 may receive a first voice command associated with a first process, may start a current session and may perform a first sequence of steps using the first process. After the first sequence of steps has been performed and the first process is stopped, the system 100 may receive a second voice command associated with a second process. At the time that the system 100 receives the second voice command, the first process has stopped but the system 100 may store progress data associated with the current session in temporary storage (e.g., the progress data will be discarded when starting a new session). If the system 100 determines to end the first process after receiving the second voice command, the system 100 may discard the progress data, such that if the system 100 receives a third voice command associated with the first process the system 100 would start a new session from a beginning. In contrast, if the system 100 instead determines to halt the first process after receiving the second voice command, the system 100 may store the progress data associated with the current session, such that if the system 100 receives a third voice command associated with the first process the system 100 would resume the previous session from the end of the first sequence of steps.

The system 100 may determine when to store the progress data and when not to store the progress data using multiple techniques. For example, the server(s) 120 may determine that the user has completed a session (e.g., completed a final step in a series of steps) so that progress data is not necessary and may end the process without storing the progress data. Additionally or alternatively, the server(s) 120 may determine that the user has not completed a session (e.g., additional steps follow a current step in a series of steps) and may determine to save the progress data before halting the process.

The server(s) 120 may respond differently based on different actions and/or processes. For example, when the user instructs the server(s) 120 to switch from a first process to a second process, the server(s) 120 may interpret this as an implicit command to store the progress data prior to halting the first process, regardless of a current state of the first process. However, when the user instructs the server(s) 120 to switch from the second process to a third process, the server(s) 120 may end the second process without storing the progress data regardless of the current state of the second process. Similarly, when the system 100 determines that a timeout occurred (e.g., no input for a period of time, such as 8 seconds) while operating the first process, the server(s) 120 may store the progress data whereas when the system 100 determines that a timeout occurred while operating the second process, the server(s) 120 may end the second process without storing the progress data.

When receiving a voice command associated with a process that has progress data, the server(s) 120 may determine whether to restart the process from a beginning or to resume from a previous session using the progress data. In some examples, different voice commands may instruct the system 100 to restart a process or to resume from a previous session using the progress data. For example, a first voice command (e.g., "start recipes," "restart recipes," "begin recipes," etc.) may restart the process (e.g., begin a new session without the progress data) and a second voice command (e.g., "resume recipes," "continue recipes," etc.) may resume the process (e.g., resume the previous session using the progress data). Additionally or alternatively, the user may explicitly request that the system 100 store progress data for a process (e.g., "store progress," "save checkpoint," "save for later," etc.) and/or delete stored progress data (e.g., "delete progress," discard checkpoint," etc.).

In some examples, the system 100 may interpret a voice command based on a list of processes that are associated with progress data. For example, when the system 100 halts a first process (e.g., a cookbook application), the system 100 may store progress data associated with the first process along with additional data (e.g., keywords associated with the first process, current state of the first process, identification of the first process, a human-readable name associated with the first process, a task and/or task type, a session identification, an expiration date associated with the progress data or the like) and may add the first process to the list of processes. When receiving the voice command (e.g., "resume the recipe"), the system 100 may identify a command associated with the list of processes (e.g., "resume"), determine that the first process is included in the list of processes, may identify the first process (e.g., using keywords such as "recipe") and may resume the first process using the progress data.

As illustrated in FIG. 1, the server(s) 120 may send (130) an instruction to operate a first process to the remote server(s) 20. For example, the user may be interacting with a third party process associated with the remote server(s) 20, using the server(s) 120 as an intermediary to perform speech processing and generate synthesized speech. The server(s) 120 may determine (132) to operate a second process. For example, the server(s) 120 may receive a voice command from the user instructing the server(s) 120 to start a second process.

Prior to ending the first process, the server(s) 120 may determine (134) that the first process is capable of using progress data and may determine (136) a current checkpoint associated with the first process. For example, the remote server(s) 20 may periodically send checkpoints to the server(s) 120 and server(s) 120 may determine the most recent checkpoint received from the remote server(s) 20. Additionally or alternatively, after determining to operate the second process the server(s) 120 may send a request to the remote server(s) 20 for the current checkpoint and may receive the current checkpoint. The server(s) 120 may associate (138) the checkpoint with the first process and may send (140) an instruction to the remote server(s) 20 to save progress data corresponding to the checkpoint. For example, the server(s) 120 may store the association between the first process and the checkpoint in an association table, which may be stored on the server(s) 120 and/or associated with a user profile. In response to the instruction, the remote server(s) 20 may store progress data on the remote server(s) 20.

The server(s) 120 may operate (142) a second process for a period of time and may determine (144) to operate the first process. For example, the second process may be a first party process running on the server(s) 120 and the server(s) 120 may receive a voice command from the user instructing the server(s) 120 to resume the first process. The server(s) 120 may retrieve (146) the checkpoint associated with the first process (e.g., from the association table, from the use profile or the like), may send (148) the checkpoint to the remote server(s) 20 and may send (150) an instruction to resume operating the first process from the checkpoint using the progress data. In response to the instruction, the remote server(s) 20 may identify a location of the progress data based on the checkpoint, may load the progress data and may resume functionality of the first process from the previous session. Thus, the system 100 may enable the first process to resume from the previous session despite the first process being a third party process that isn't controlled by the server(s) 120.

Figure 2:
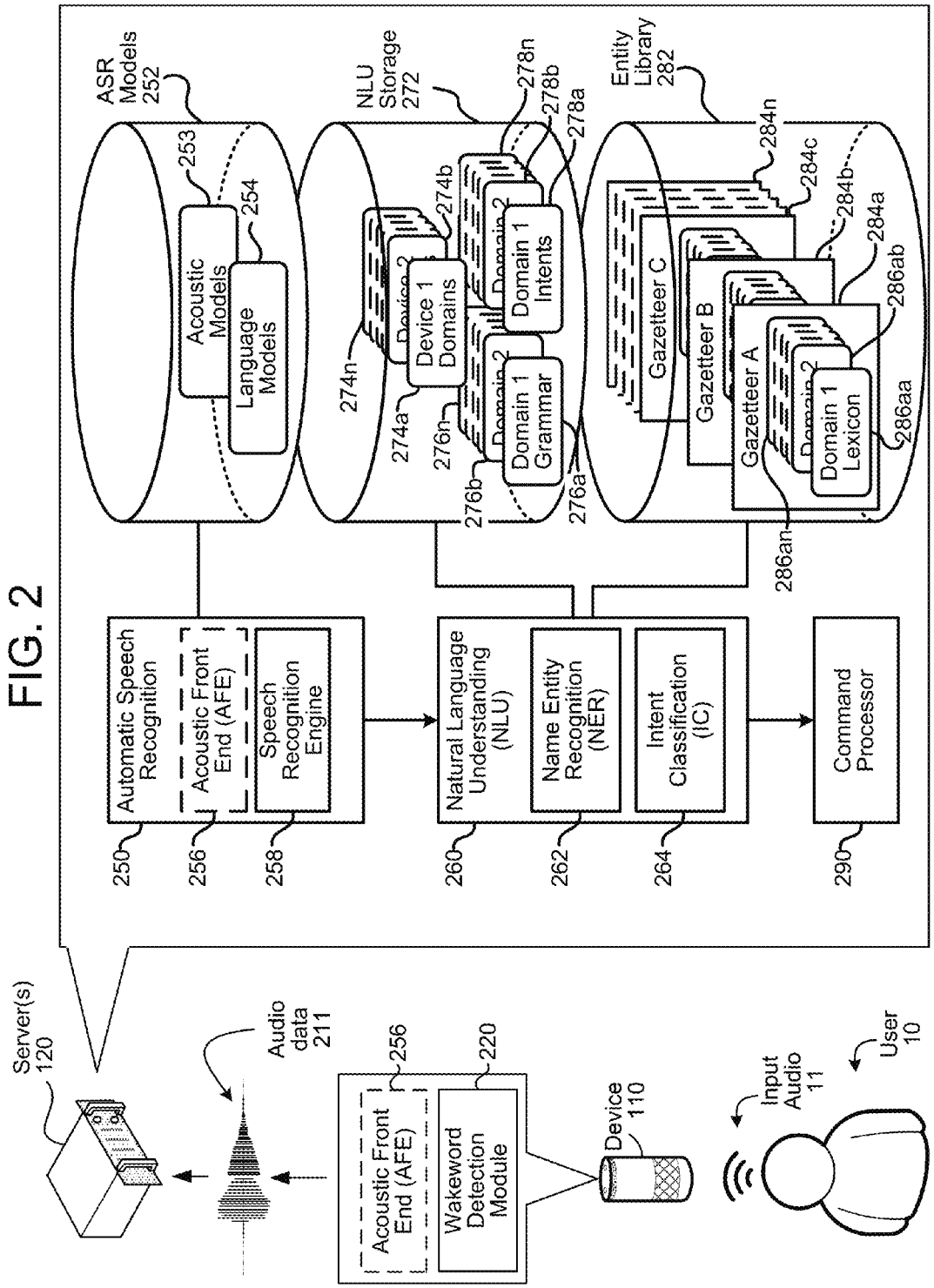
FIG. 2 is a conceptual diagram of how a spoken utterance is processed according to examples of the present disclosure.

The system 100 of FIG. 1 may operate using various speech processing components as described in FIG. 2. FIG. 2 is a conceptual diagram of how a spoken utterance is processed, allowing a system to capture and execute commands spoken by a user, such as spoken commands that may follow a wakeword. The various components illustrated may be located on a same or different physical devices. Communication between various components illustrated in FIG. 2 may occur directly or across network(s) 10. An audio capture component, such as microphone(s) 112 of device 110, captures audio 11 corresponding to a spoken utterance.

The device 110, using a wakeword detection module 220, then processes the audio 11, or audio data 211 corresponding to the audio 11, to determine if a keyword (such as a wakeword) is detected in the audio 11. Following detection of a wakeword, the device sends audio data 211 corresponding to the utterance, to a server(s) 120 that includes an ASR module 250. The audio data 211 may be output from an acoustic front end (AFE) 256 located on the device 110 prior to transmission. Or the audio data 211 may be in a different form for processing by a remote AFE 256.

The wakeword detection module 220 works in conjunction with other components of the device, for example microphone(s) 112 to detect keywords in audio 11. For example, the device 110 may convert audio 11 into audio data 211, and process the audio data 211 with the wakeword detection module 220 to determine whether speech is detected, and if so, if the audio data 211 comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio 11 received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data 211 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 211 corresponding to input audio 11 to the server(s) 120 for speech processing. Audio data 211 corresponding to that audio 11 may be sent to a server(s) 120 for routing to a recipient device or may be sent to the server for speech processing for interpretation of the included speech (either for purposes of enabling voice-communications and/or for purposes of executing a command in the speech). The audio data 211 may include data corresponding to the wakeword, or the portion of the audio data 211 corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 211 into text data. The ASR transcribes audio data 211 into text data representing the words of the speech contained in the audio data 211. The text data may then be used by other components for various purposes, such as executing system commands, inputting data, etc. A spoken utterance in the audio data 211 is input to a processor configured to perform ASR which then interprets the utterance based on the similarity between the utterance and pre-established language models 254 stored in an ASR model knowledge base (ASR Models Storage 252). For example, the ASR process may compare the input audio data 211 with models for sounds (e.g., subword units or phonemes) and sequences of sounds to identify words that match the sequence of sounds spoken in the utterance of the audio data 211.

An ASR process 250 converts the audio data 211 into text data. The ASR transcribes audio data 211 into text data representing the words of the speech contained in the audio data 211. The text data may then be used by other components for various purposes, such as executing system commands, inputting data, etc. A spoken utterance in the audio data 211 is input to a processor configured to perform ASR which then interprets the utterance based on the similarity between the utterance and pre-established language models 254 stored in an ASR model knowledge base (ASR Models Storage 252). For example, the ASR process may compare the input audio data 211 with models for sounds (e.g., subword units or phonemes) and sequences of sounds to identify words that match the sequence of sounds spoken in the utterance of the audio data 211.

The different ways a spoken utterance may be interpreted (i.e., the different hypotheses) may each be assigned a probability or other type of a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text data recognized in the audio data 211. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine 258. The acoustic front end (AFE) 256 transforms the audio data 211 from the microphone(s) 112 into data for processing by the speech recognition engine 258. The speech recognition engine 258 compares the speech recognition data with acoustic models 253, language models 254, and other data models and information for recognizing the speech conveyed in the audio data 211. The AFE 256 may reduce noise in the audio data 211 and divide the digitized audio data 211 into frames representing time intervals for which the AFE 256 determines a number of values, called features, representing the qualities of the audio data 211, along with a set of those values, called a feature vector or audio feature vector, representing the features/qualities of the audio data 211 within the frame. Many different features may be determined, as known in the art, and each feature represents some quality of the audio 11 that may be useful for ASR processing. A number of approaches may be used by the AFE 256 to process the audio data 211, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 258 may process the output from the AFE 256 with reference to information stored in speech/model storage 252. Alternatively, post front-end processed data (such as feature vectors) may be received by the device executing ASR processing from another source besides the internal AFE 256. For example, the device 110 may process audio data 211 into feature vectors (for example using an on-device AFE 256) and transmit that information to a server across network(s) 10 for ASR processing. Feature vectors may arrive at the server encoded, in which case they may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text data matches for the same sound.

Following ASR processing, the ASR results may be sent by the speech recognition engine 258 to other processing components, which may be local to the device performing ASR and/or distributed across the network(s) 10. For example, ASR results in the form of a single textual representation of the speech, an N-best list including multiple hypotheses and respective scores, lattice, etc. may be sent to a server, such as the server(s) 120, for natural language understanding (NLU) processing, such as conversion of the text data into commands for execution, either by the device 110, by the server(s) 120, or by another device (such as a server running a search engine, etc.).

The device performing NLU processing 260 (e.g., server(s) 120) may include various components, including potentially dedicated processor(s), memory, storage, etc. A device configured for NLU processing 260 may include a named entity recognition (NER) module 252, intent classification (IC) module 264, NLU storage 272 and a and knowledge base (not shown). The knowledge base is a database or other information storage that may include information about entities that may be used in resolving user queries. The NLU process may also utilize gazetteer information (284*a*-284*n*) stored in entity library storage 282. The knowledge base and/or gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process 260 takes textual input (such as processed from ASR 250 based on the utterance 11) and attempts to make a semantic interpretation of the text data. That is, the NLU process 260 determines the meaning behind the text data based on the individual words and then implements that meaning. NLU processing 260 interprets a text string to derive an intent or a desired action from the user as well as the pertinent pieces of information in the text data that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process 260 may be configured to parse and tag to annotate text data as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server(s) 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU storage 272 includes a database of devices (274*a*-274*n*) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping", "music", "calendaring", etc. As such, each domain may be associated with a particular language model and/or grammar database (276*a*-276*n*), a particular set of intents/actions (278*a*-278*n*), and a particular personalized lexicon (286). Each gazetteer (284*a*-284*n*) may include domain-indexed lexical information associated with a particular user and/or device. For example, the Gazetteer A (284*a*) includes domain-index lexical information 286*aa* to 286*an*. A user's music-domain lexical information might include album titles, artist names, and song names, for example, whereas a user's contact-list lexical information might include the names of contacts. Since every user's music collection and contact list is presumably different, this personalized information improves entity resolution.

In some examples, the device 110 may determine contextual information to assist with performing speech processing, such as a domain, based on the process operating when a voice command is received. For example, the device 110 may associate a first domain with a first feature group. When the device 110 receives a voice command while operating a first process corresponding to the first feature group, the device 110 may generate contextual information that indicates the first domain and/or other information and may associate the contextual information with the voice command.

A query may be processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains being ordinarily selected to be the correct result.

An intent classification (IC) module 264 parses the query to determine an intent or intents for each identified domain, where the intent corresponds to the action to be performed that is responsive to the query. Each domain is associated with a database (278*a*-278*n*) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 262 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrases relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (in the NLU's storage 272). For instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER module 262 may also use contextual operational rules to fill slots. For example, if a user had previously requested to pause a particular song and thereafter requested that the voice-controlled device "please un-pause my music," the NER module 262 may apply an inference-based rule to fill a slot associated with the name of the song that the user currently wishes to play—namely the song that was playing at the time the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text data, commands, etc.) may then be sent to a command processor 290, which may be located on a same or separate server(s) 120 as part of the system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search query (for example, requesting the return of search results), the destination command processor 290 may include a search engine processor, such as one located on a search server, configured to execute a search command and determine search results, which may include output text data to be processed by a TTS engine and output from a device as synthesized speech, such as announcements made with the pages described above.

Figure 3:
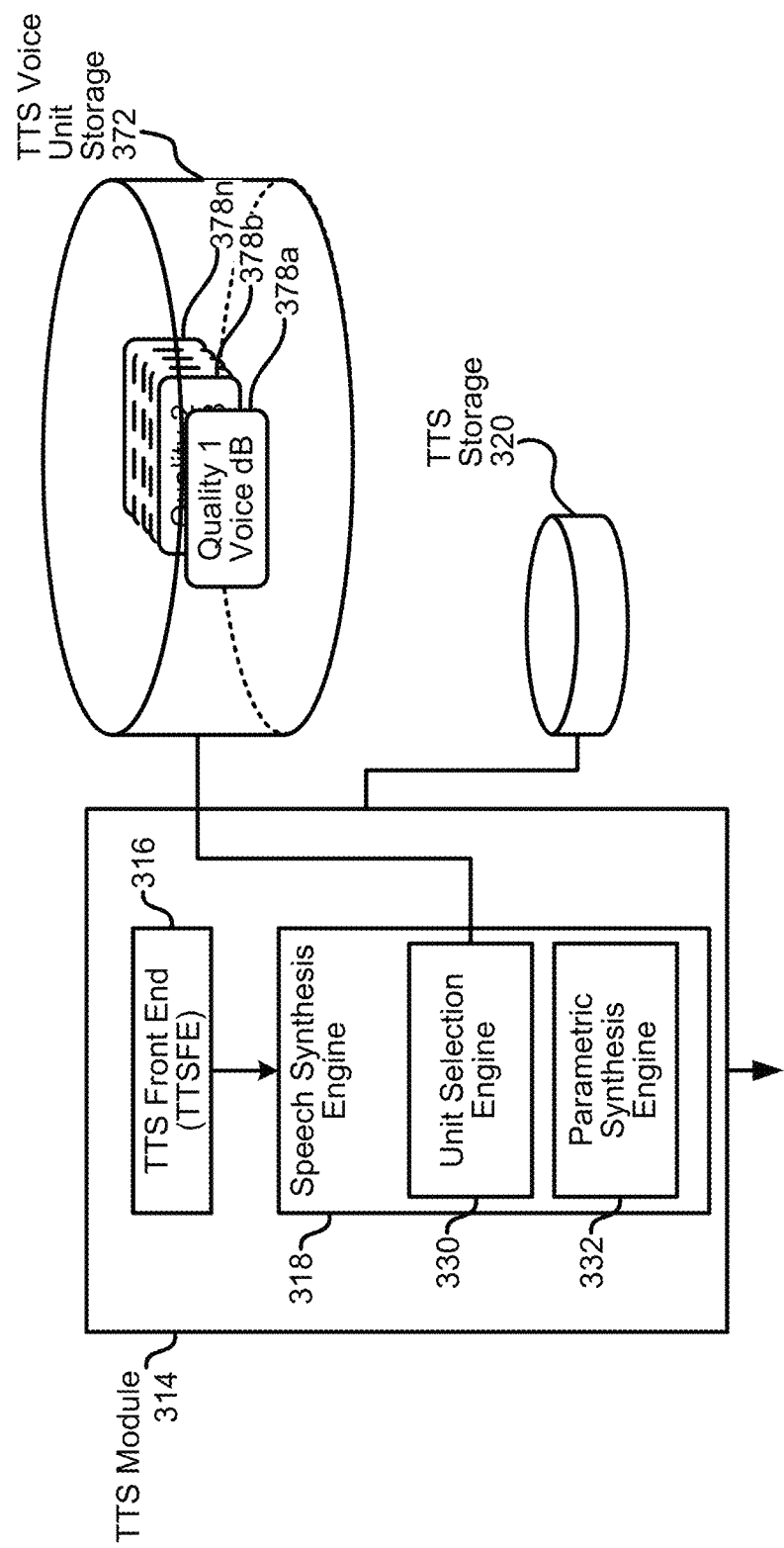
FIG. 3 illustrates an example of generating text-to-speech (TTS) or synthesized speech according to examples of the present disclosure.

FIG. 3 illustrates an example of generating text-to-speech (TTS) or synthesized speech according to examples of the present disclosure. The TTS module/processor 314 includes a TTS front end (TTSFE) 316, a speech synthesis engine 318, and TTS storage 320. The TTSFE 316 transforms input text data (for example from command processor 290) into a symbolic linguistic representation for processing by the speech synthesis engine 318. The TTSFE 316 may also process tags or other data input to the TTS module that indicate how specific words should be pronounced (e.g., an indication that a word is an interjection). The speech synthesis engine 318 compares the annotated phonetic units models and information stored in the TTS storage 320 for converting the input text data into speech. The TTSFE 316 and speech synthesis engine 318 may include their own controller(s)/processor(s) and memory or they may use the controller/processor and memory 310 of the server(s) 120, device 110, or other device, for example. Similarly, the instructions for operating the TTSFE 316 and speech synthesis engine 318 may be located within the TTS module 314, within the memory and/or storage of the server(s) 120, device 110, or within an external device.

Text data input into a TTS module 314 may be sent to the TTSFE 316 for processing. The front-end may include modules for performing text normalization, linguistic analysis, and linguistic prosody generation. During text normalization, the TTSFE processes the text data input and generates standard text data, converting such things as numbers, abbreviations (such as Apt., St., etc.), symbols ($, %, etc.) into the equivalent of written out words.

During linguistic analysis the TTSFE 316 analyzes the language in the normalized text data to generate a sequence of phonetic units corresponding to the input text data. This process may be referred to as phonetic transcription. Phonetic units include symbolic representations of sound units to be eventually combined and output by the system as speech. Various sound units may be used for dividing text data for purposes of speech synthesis. A TTS module 314 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage module 320. The linguistic analysis performed by the TTSFE 316 may also identify different grammatical components such as prefixes, suffixes, phrases, punctuation, syntactic boundaries, or the like. Such grammatical components may be used by the TTS module 314 to craft a natural sounding audio waveform output. The language dictionary may also include letter-to-sound rules and other tools that may be used to pronounce previously unidentified words or letter combinations that may be encountered by the TTS module 314. Generally, the more information included in the language dictionary, the higher quality the speech output.

Based on the linguistic analysis the TTSFE 316 may then perform linguistic prosody generation where the phonetic units are annotated with desired prosodic characteristics, also called acoustic features, which indicate how the desired phonetic units are to be pronounced in the eventual output speech. During this stage the TTSFE 316 may consider and incorporate any prosodic annotations that accompanied the text data input to the TTS module 314. Such acoustic features may include pitch, energy, duration, and the like. Application of acoustic features may be based on prosodic models available to the TTS module 314. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTSFE 316, referred to as a symbolic linguistic representation, may include a sequence of phonetic units annotated with prosodic characteristics. This symbolic linguistic representation may be sent to a speech synthesis engine 318, also known as a synthesizer, for conversion into an audio waveform of speech for output to an audio output device and eventually to a user. The speech synthesis engine 318 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

A speech synthesis engine 318 may perform speech synthesis using one or more different methods. In one method of synthesis called unit selection, described further below, a unit selection engine 330 matches the symbolic linguistic representation created by the TTSFE 316 against a database of recorded speech, such as a database of a voice corpus. The unit selection engine 330 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (such as its pitch, energy, etc.), as well as other information, such as where the phonetic unit appears in a word, sentence, or phrase, the neighboring phonetic units, etc.

Using all the information in the unit database, a unit selection engine 330 may match units to the input text data to create a natural sounding waveform. The unit database may include multiple examples of phonetic units to provide the system with many different options for concatenating units into speech. One benefit of unit selection is that, depending on the size of the database, a natural sounding speech output may be generated. As described above, the larger the unit database of the voice corpus, the more likely the system will be able to construct natural sounding speech.

In another method of synthesis called parametric synthesis parameters such as frequency, volume, noise, are varied by a parametric synthesis engine 332, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. A TTS module 314 may include an acoustic model, or other models, which may convert a symbolic linguistic representation into a synthetic acoustic waveform of the text data input based on audio signal manipulation. The acoustic model includes rules which may be used by the parametric synthesis engine 332 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTSFE 316.

The parametric synthesis engine 332 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (such as the phoneme identity, stress, accent, position, etc.). An initial determination of a probability of a potential phoneme may be associated with one state. As new text data is processed by the speech synthesis engine 318, the state may change or stay the same, based on the processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

Unit selection speech synthesis may be performed as follows. Unit selection includes a two-step process. First a unit selection engine 330 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the unit selection engine 330. As part of unit selection, the unit selection engine 330 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS storage 320, in storage 312, or in another storage component. For example, different unit selection databases may be stored in TTS voice unit storage 372. Each speech unit database includes recorded speech utterances with the utterances' corresponding text data aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 318 may attempt to select a unit in the speech unit database that most closely matches the input text data (including both phonetic units and prosodic annotations). Generally the larger the voice corpus/speech unit database the better the speech synthesis may be achieved by virtue of the greater number of unit samples that may be selected to form the precise desired speech output.

Audio waveforms including the speech output from the TTS module 314 may be sent to an audio output component, such as a speaker for playback to a user or may be sent for transmission to another device, such as another server(s) 120, for further processing or output to a user. Audio waveforms including the speech may be sent in a number of different formats such as a series of feature vectors, uncompressed audio data, or compressed audio data. For example, audio speech output may be encoded and/or compressed by an encoder/decoder (not shown) prior to transmission. The encoder/decoder may be customized for encoding and decoding speech data, such as digitized audio data, feature vectors, etc. The encoder/decoder may also encode non-TTS data of the system, for example using a general encoding scheme such as .zip, etc.

A TTS module 314 may be configured to perform TTS processing in multiple languages. For each language, the TTS module 314 may include specially configured data, instructions and/or components to synthesize speech in the desired language(s). To improve performance, the TTS module 314 may revise/update the contents of the TTS storage 320 based on feedback of the results of TTS processing, thus enabling the TTS module 314 to improve speech recognition.

Other information may also be stored in the TTS storage 320 for use in speech recognition. The contents of the TTS storage 320 may be prepared for general TTS use or may be customized to include sounds and words that are likely to be used in a particular application. For example, for TTS processing by a global positioning system (GPS) device, the TTS storage 320 may include customized speech specific to location and navigation. In certain instances the TTS storage 320 may be customized for an individual user based on his/her individualized desired speech output. For example a user may prefer a speech output voice to be a specific gender, have a specific accent, speak at a specific speed, have a distinct emotive quality (e.g., a happy voice), or other customizable characteristic(s) (such as speaking an interjection in an enthusiastic manner) as explained in other sections herein. The speech synthesis engine 318 may include specialized databases or models to account for such user preferences.

For example, to create the customized speech output of the system, the system may be configured with multiple voice corpuses/unit databases 378a-378n, where each unit database is configured with a different "voice" to match desired speech qualities. The voice selected by the TTS module 314 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterance may be spoken by an individual and recorded by the system. The TTS training utterances used to train a TTS voice corpus may be different from the training utterances used to train an ASR system or the models used by the speech quality detector. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice corpuses 378 may then be used during runtime to perform unit selection to synthesize speech having a speech quality corresponding to the input speech quality.

Figure 4:
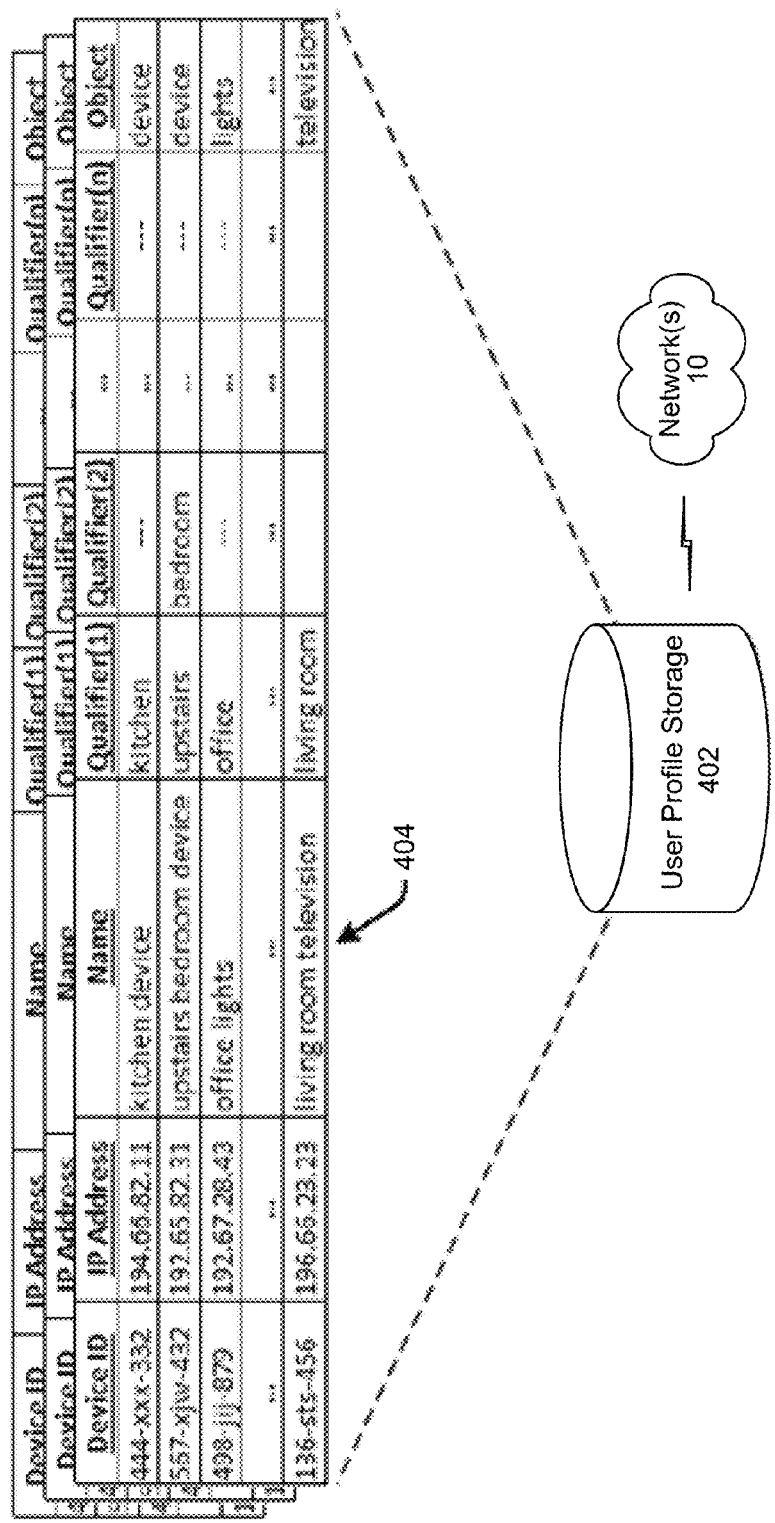
FIG. 4 illustrates data stored and associated with user profiles according to embodiments of the present disclosure.

The server(s) 120 may include or refer to data regarding user accounts, shown by the user profile storage 402 illustrated in FIG. 4. The user profile storage 402 may be located proximate to server(s) 120, or may otherwise be in communication with various components, for example over network(s) 10. The user profile storage 402 may include a variety of information related to individual users, households, accounts, etc. that interact with the system 100. For illustration, as shown in FIG. 4, the user profile storage 402 may include data regarding the devices associated with particular individual user accounts 404. In an example, the user profile storage 402 is a cloud-based storage. Such data may include device identifier (ID) and internet protocol (IP) address information for different devices as well as names by which the devices may be referred to by a user. Further qualifiers describing the devices may also be listed along with a description of the type of object of the device.

Further, the user account 404 may include or be associated with an association table or a list of processes associated with progress data, as discussed in greater detail below with regard to FIG. 7. Thus, while the disclosure describes multiple examples of associating progress data with the device 110, the disclosure is not limited thereto and the progress data may be associated with individual users, households, accounts, etc. without departing from the disclosure. For example, a first process may be started using a first device 110a and may be resumed on a second device 110b using the progress data stored on the server(s) 120 without departing from the disclosure.

FIG. 5 illustrates an example of customer interaction according to embodiments of the present disclosure. As illustrated in FIG. 5, a user 10 may be cooking while interacting with the device 110 in scenario 500. For example, the device 110 may be reading a recipe to the user 10 by generating audio output 510 (e.g., "Boil for 5-6 minutes, stirring gently.") associated with a first process. While a current session of the first process is ongoing (e.g., the recipe includes additional steps after the current step), the user 10 may input a command to start a second process, such as audio input 520 (e.g., "Alexa, set a timer for 5 minutes"). The system 100 may end the first process and start the second process (e.g., set a timer for 5 minutes).

After the timer expires, the user 10 may want to continue hearing the recipe associated with the first process. A typical system that is unable to use progress data with third party processes would restart the first process from a beginning of the recipe, requiring the user 10 to manually advance the recipe until the current step. However, as the system 100 is able to use progress data with third party processes, the server(s) 120 may determine that the user 10 wants to resume the first process (e.g., recipe), may identify the progress data associated with the first process (e.g., checkpoint, reference location or total progress data) and may send the progress data to the remote server(s) 20 along with an instruction to resume operating the first process using the progress data (e.g., continue reading the recipe from the current step). Thus, the user 10 may seamlessly switch from the second process back to the first process without restarting the first process.

Figure 6A:
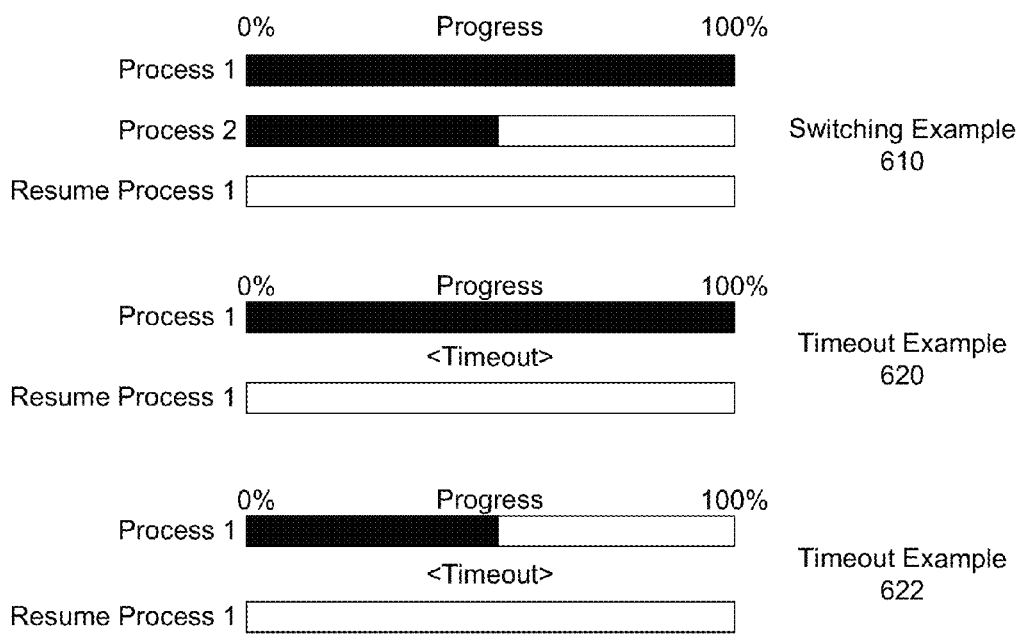
FIGS. 6A-6B illustrate examples of resuming without progress data and resuming with progress data according to embodiments of the present disclosure.
Figure 6B:
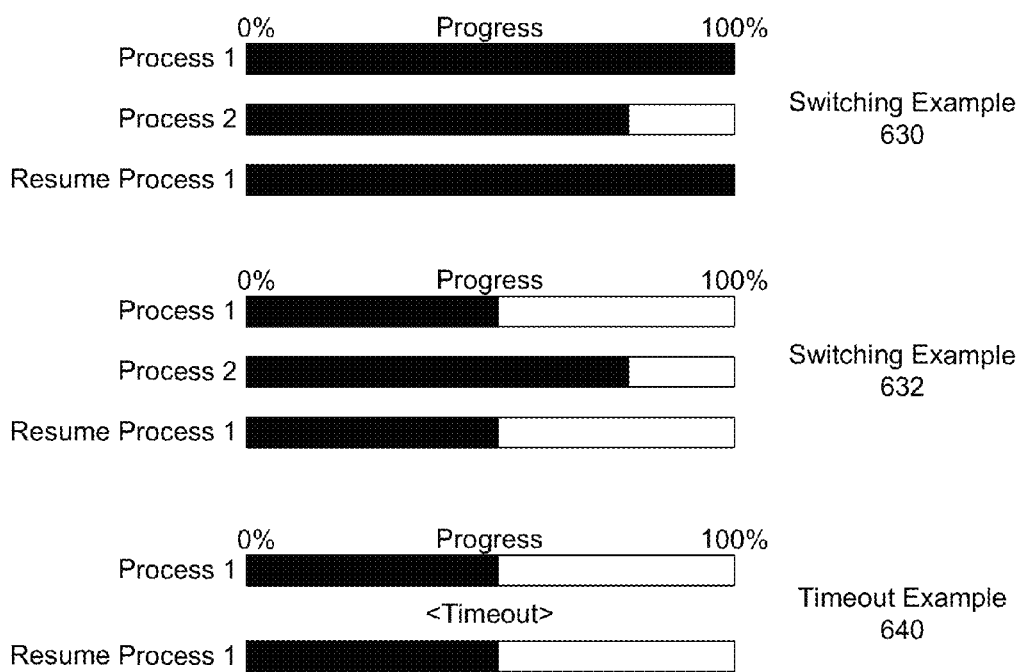

FIGS. 6A-6B illustrate examples of resuming without progress data and resuming with progress data according to embodiments of the present disclosure. As discussed above, the system 100 may determine when to store progress data and when not to store the progress data in different situations. For example, the server(s) 120 may determine that the user 10 has completed a session (e.g., completed a final step in a series of steps) so that progress data is not necessary and may end the process without storing the progress data. Additionally or alternatively, the server(s) 120 may determine that the user 10 has not completed a session (e.g., additional steps follow a current step in a series of steps) and may determine to save the progress data before halting the process.

In addition, the server(s) 120 may respond differently based on different actions and/or processes. For example, when the user 10 instructs the server(s) 120 to switch from a first process to a second process, the server(s) 120 may interpret this as an implicit command to store the progress data prior to halting the first process, regardless of a current state of the first process. However, when the user 10 instructs the server(s) 120 to switch from the second process to a third process, the server(s) 120 may end the second process without storing the progress data regardless of the current state of the second process. Similarly, when the system 100 determines that a timeout occurred (e.g., no input for a period of time, such as 8 seconds) while operating the first process, the server(s) 120 may store the progress data whereas when the system 100 determines that a timeout occurred while operating the second process, the server(s) 120 may end the second process without storing the progress data.

As illustrated in FIG. 6A, the server(s) 120 may determine not to store progress data when the user 10 has completed a session. As illustrated by switching example 610, the server(s) 120 may determine that Process 1 is complete (e.g., 100% progress, which corresponds to a final step in a series of steps or the like) when switching from Process 1 to Process 2. Therefore, the server(s) 120 don't store progress data for Process 1 and when resuming Process 1 at a later point in time, the server(s) 120 will restart from a beginning (e.g., 0% progress, corresponding to a first step in the series of steps).

As illustrated by timeout example 620, the server(s) 120 may determine that Process 1 is complete at the time that the server(s) 120 detects a timeout (e.g., no input for a period of time, such as 8 seconds). Therefore, the server(s) 120 don't store progress data and when resuming Process 1 at a later point in time, the server(s) 120 will restart from the beginning. In contrast, timeout example 622 illustrates an example where the server(s) 120 determine that Process 1 is not complete (e.g., 50% progress, which corresponds to a current step that has subsequent steps) but don't store progress data. For example, the server(s) 120 may never store progress data for specific processes (e.g., always restart from a beginning), the server(s) 120 may interpret a timeout as an implicit command to delete progress data, or the like. Therefore, when resuming Process 1 at a later point in time, the server(s) 120 will restart from the beginning.

As illustrated in FIG. 6B, the server(s) 120 may determine to store progress data when the user 10 switches processes, regardless of whether the user 10 has completed a current session. As illustrated by switching example 630, the server(s) 120 may determine that Process 1 is complete (e.g., 100% progress, which corresponds to a final step in a series of steps or the like) when switching from Process 1 to Process 2. However, the server(s) 120 may still store progress data for Process 1 and when resuming Process 1 at a later point in time, the server(s) 120 will resume the previous session (e.g., 100% progress). Similarly, as illustrated by switching example 632, the server(s) 120 may determine that Process 1 is not complete (e.g., 50% progress, which corresponds to a current step that has subsequent steps) when switching from Process 1 to Process 2. The server(s) 120 may store progress data for Process 1 and when resuming Process 1 at a later point in time, the server(s) 120 will resume the previous session (e.g., 50% progress).

As illustrated in switching examples 630-632, the server(s) 120 may interpret the user 10 switching between processes as an implicit command to store the progress data, even when the current session appears to be complete. For example, the user 10 may want to resume Process 1 from the end, or may have skipped steps and want to go back, or the like. As discussed above, in some examples different voice commands may instruct the system 100 to restart a process or to resume from a previous session using the progress data. For example, a first voice command (e.g., "start recipes," "restart recipes," "begin recipes," etc.) may restart the process (e.g., begin a new session without the progress data) and a second voice command (e.g., "resume recipes," "continue recipes," etc.) may resume the process (e.g., resume the previous session using the progress data). Additionally or alternatively, the user may explicitly request that the system 100 store progress data for a process (e.g., "store progress," "save checkpoint," "save for later," etc.) and/or delete stored progress data (e.g., "delete progress," discard checkpoint," etc.).

In some examples, the server(s) 120 may determine to store progress data when detecting that a timeout occurred, as shown by timeout example 640. As illustrated by timeout example 640, the server(s) 120 may determine that Process 1 is not complete (e.g., 50% progress, which corresponds to a current step that has subsequent steps) and may store progress data. For example, the server(s) 120 may always store progress data for specific processes (e.g., always resume from a previous session), the server(s) 120 may interpret a timeout as an implicit command to store progress data, or the like. Therefore, when resuming Process 1 at a later point in time, the server(s) 120 will resume the previous session (e.g., 50% progress).

FIG. 7 illustrates examples of association tables according to embodiments of the present disclosure. As discussed above, when the server(s) 120 determine to store progress data, the server(s) 120 may add a process to an association table in order to track the stored progress data. The progress data stored by the server(s) 120 may include a checkpoint (e.g., current step in a series of steps), a reference location (e.g., memory address or other pointer corresponding to total progress data stored on the remote server(s) 20) and/or total progress data (e.g., a memory state associated with the process, which is stored on the server(s) 120). As illustrated in FIG. 7, the association table can be simple, such as a first association table 710 including only a process identification (ID) and a checkpoint, a second association table 712 including only the process ID and a reference location, and/or a third association table 714 including only the process ID and the total progress data. While FIG. 7 illustrates the total progress data being stored the third association table 714, the disclosure is not limited thereto and the third association table 714 may store a local reference location or other pointer referencing the total progress data stored locally on the server(s) 120 (as opposed to the reference location included in the second association table 712, which references the total progress data stored remotely on the remote server(s) 20).

Additionally or alternatively, the association table can include additional data associated with the progress data. For example, FIG. 7 illustrates a fourth association table 720 that includes the process ID and progress data associated with the first process (e.g., checkpoint, reference location, total progress data and/or the like) along with additional data. Examples of additional data include a human-readable name associated with the process, a task associated with the process, a task type corresponding to the task, a session ID associated with the previous session, and/or an expiration date associated with the progress data, as illustrated in the fourth association table 720, along with keywords associated with the first process, a current state of the first process, user identification, speaker identification, or other information not illustrated in FIG. 7. In some examples, the progress data stored in the fourth association table 720 may identify that total progress data is stored in the independent storage device (e.g., online storage) discussed above. For example, when the system 100 determines to resume the process using the progress data, the server(s) 120 may send an instruction to the remote server(s) 20 to retrieve the total progress data from the independent storage device.

A process may have multiple different types of tasks and/or types of tasks. Keeping track of an active task and a type of task may assist the system 100 in identifying and resuming the process at a later point in time. For example, processes may be associated with step-based tasks (e.g., reading a recipe in discrete steps), question and answer tasks (e.g., user asks a question of the process and/or the process asks a question of the user), general workflow tasks (e.g., bank account session) and/or other types of tasks.

In some examples, the server(s) 120 may use the association table to identify processes that are associated with progress data and may resume the processes using the progress data. For example, the server(s) 120 may determine a list of processes associated with progress data by including each of the process IDs stored in the association table.

FIG. 8 is a communication diagram conceptually illustrating operating a process according to embodiments of the present disclosure. As discussed above, the server(s) 120 may enable third party processes (e.g., applications, programs or portions thereof) by functioning as an intermediary between the device 110 and the remote server(s) 20 associated with the third party processes. For example, a first remote server may be associated with a first process, a second remote server may be associated with a second process, and so on. During operation of a third party process, the server(s) 120 may preform speech processing on audio data received from the device 110, send instructions to the remote server(s) 20 to perform an action (e.g., execute a command, retrieve data or the like), may receive data from the remote server(s) 20 and may generate and send synthesized speech to the device 110 for output to the user 10.

As illustrated in FIG. 8, the device 110 may capture (810) audio data using microphone(s) 112 on the device 110 and may send (812) the audio data to the server(s) 120. The server(s) 120 may perform (814) speech processing (e.g., ASR) on the audio data to determine first text data, may determine (816) a command based on the first text data (e.g., using Natural Language Understanding (NLU)) and may determine (818) a first process associated with the command. As part of determining the first process, the server(s) 120 may determine remote server(s) 20 associated with the first process and may send (820) command data to the remote server(s) 20. The command data may include an instruction, a query and/or additional data (e.g., data required by the remote server(s) 20 need to execute the command), which may include the ASR output, the NLU results, information from the user profile or the like.

The remote server(s) 20 may perform (822) an action (e.g., execute the command, retrieve data or the like) and may send (824) data to the server(s) 120. The server(s) 120 may generate (826) synthesized output (e.g., synthesized speech, images or other content) based on the data, may send (828) the synthesized output to the device 110 and the device 110 may generate (830) output audio using the synthesized output. While present disclosure illustrates the device 110 generating output audio, the disclosure is not limited thereto. Instead, the synthesized output may include audio output data and/or image output data and the device 110 may generate images on a display of the device 110 without departing from the disclosure.

To illustrate an example, the user 10 may input a voice command (e.g., "Alexa, order a Dominos pizza" to the device 110. The device 110 may send the audio data to the server(s) 120, the server(s) 120 may determine that the voice command corresponds to a Dominos process associated with a first remote server 20 and may send command data associated with the voice command to the first remote server 20. The first remote server 20 may receive the command data and may request information about what type of pizza (e.g., size, toppings, crust, etc.). The server(s) 120 may generate synthesized speech (e.g., "What toppings would you like on your pizza?") and send the synthesized speech to the device 110 for playback to the user 10. After hearing the synthesized speech, the user 10 may input a second voice command (e.g., "Pepperoni") and the system 100 may repeat the process beginning with step 810.

If the server(s) 120 determine to halt the process (e.g., receive a voice command to start a second process, determine that a timeout occurred, receive a voice command to save progress data, etc.), the server(s) 120 may store progress data so that the user 10 may resume the process from the previous session. For example, if the user 10 has input information about the pizza (e.g., size, toppings, crust, etc.) but has not yet confirmed a time of delivery or billing details, the server(s) 120 may resume the process by identifying the information about the pizza and requesting the time of delivery or billing details. Therefore, the user 10 may seamlessly transition between the Dominos process and other processes on the device 110 without restarting the Dominos process from the beginning.

In order to enable the system 100 to resume functionality of third party processes, the system 100 may store progress data associated with a current status of the third party process (e.g., current session). The progress data may include a memory state associated with the third party process (e.g., total progress data), a reference location or other pointer corresponding to the total progress data, a checkpoint (e.g., current step in a series of steps) used to determine the total progress data, or the like. In some examples, portions of the progress data may be stored on the server(s) 120 (e.g., reference location or checkpoint) and the remote server(s) 20 (e.g., total progress data), and to resume the third party process the server(s) 120 may send the reference location/checkpoint to the remote server(s) 20 with an instruction to the remote server(s) 20 to load the total progress data and resume the previous session. In other examples, the progress data (e.g., total progress data) may be stored on the server(s) 120 and to resume the third party process the server(s) 120 may send the total progress data to the remote server(s) 20.

FIGS. 9A-9D are communication diagrams conceptually illustrating examples of storing progress data according to embodiments of the present disclosure. For ease of explanation, the following drawings will be described with regard to storing progress data (e.g., total progress data) or storing checkpoints (e.g., a checkpoint, a reference location or other pointer that can be used to identify the total progress data). FIGS. 9A-9B illustrate a first example in which the remote server(s) 20 periodically send the progress data/checkpoints to the server(s) 120, whereas FIGS. 9C-9D illustrate a second example in which the server(s) 120 request the progress data/checkpoint from the remote server(s) 20 upon determining to halt a process.

As illustrated in FIG. 9A, the remote server(s) 20 may operate (900) a first process as discussed in greater detail above with regard to FIG. 8. While operating the first process, the remote server(s) 20 may send (902) first progress data, send (904) second progress data and send (906) third progress data to the server(s) 120. For example, the remote server(s) 20 may periodically send enough data to enable the server(s) 120 to resume the first process at a current state. This implementation is preferable for less data intensive processes, as sending the progress data to the server(s) 120 consumes bandwidth and processing power for both the remote server(s) 20 and the server(s) 120, but this enables the server(s) 120 full control of the progress data. Therefore, it may be preferable in situations where resuming the first process is important and/or when the remote server(s) 20 is not configured to store the progress data.

The server(s) 120 may determine (908) to halt the first process. For example, the server(s) 120 may receive a voice command associated with a second process, may detect a timeout (e.g., no input to the device 110 for a period of time, such as 8 seconds), may receive a voice command instructing the server(s) 120 to end the first process, or the like. The server(s) 120 may determine (910) that the first process is capable of using progress data. For example, the first process may have a special flag or other indication that indicates to the server(s) 120 that the first process is capable of storing progress data and resuming from the stored progress data.

After determining to halt the first process and that the first process is capable of using progress data, the server(s) 120 may determine (912) that the third progress data is the most recent and may store (914) the third progress data on the server(s) 120. The disclosure is not limited thereto, however, and the server(s) 120 may determine that the third progress data is the most recent progress data and store the third progress data upon receiving the third progress data from the remote server(s) 20 in step 906. For example, the server(s) 120 may receive the second progress data and overwrite the first progress data with the second progress data (e.g., discard the first progress data and store the second progress data), may receive the third progress data and overwrite the second progress data (e.g., discard the second progress data and store the third progress data) and so on as the server(s) 120 receive progress data from the remote server(s) 20.

After storing the third progress data, the server(s) 120 may halt (916) the first process (e.g., end the first process) and may add (918) an identity of the first process to a list of processes associated with progress data. For example, the server(s) 120 may add the identity of the first process to an association table, along with information about the third progress data (e.g., reference location, pointer or the like corresponding to the third progress data) and/or additional data, as discussed above with regard to FIG. 7. The server(s) 120 may maintain the list and/or association table to keep track of processes that may be resumed using progress data. For example, the progress data may be associated with an expiration date (e.g., date, time or the like) and the server(s) 120 may remove the identity of the first process from the list and the association table after a period of time has elapsed.

As illustrated in FIG. 9B, the remote server(s) 20 may operate (900) the first process as discussed in greater detail above with regard to FIG. 8. While operating the first process, the remote server(s) 20 may send (930) an indication of a first checkpoint, send (932) an indication of a second checkpoint, send (934) an indication of a third checkpoint) to the server(s) 120. For example, the remote server(s) 20 may periodically send checkpoints to enable the server(s) 120 to track a current state of the first process in order to resume the first process from the current state at a later point in time. This implementation is preferable for more data intensive processes, as sending the progress data itself to the server(s) 120 consumes bandwidth and processing power for both the remote server(s) 20 and the server(s) 120. While the server(s) 20 is not in control of the progress data itself, which is stored on the remote server(s) 20, the server(s) 120 may instruct the remote server(s) 20 to resume the first process by only sending a most recent checkpoint.

The server(s) 120 may determine (908) to halt the first process. For example, the server(s) 120 may receive a voice command associated with a second process, may detect a timeout (e.g., no input to the device 110 for a period of time, such as 8 seconds), may receive a voice command instructing the server(s) 120 to end the first process, or the like. The server(s) 120 may determine (910) that the first process is capable of using progress data. For example, the first process may have a special flag or other indication that indicates to the server(s) 120 that the first process is capable of storing progress data and resuming from the stored progress data.

After determining to halt the first process and that the first process is capable of using progress data, the server(s) 120 may determine (936) that the third checkpoint is the most recent checkpoint and may store (938) the third checkpoint on the server(s) 120. The disclosure is not limited thereto, however, and the server(s) 120 may determine that the third checkpoint is the most recent and store the third checkpoint upon receiving the third checkpoint from the remote server(s) 20 in step 934. For example, the server(s) 120 may receive the second checkpoint and overwrite the first checkpoint with the second checkpoint (e.g., discard the first checkpoint and store the second checkpoint), may receive the third checkpoint and overwrite the second checkpoint (e.g., discard the second checkpoint and store the third checkpoint) and so on as the server(s) 120 receive checkpoint from the remote server(s) 20.

After storing the third checkpoint, the server(s) 120 may send (940) an instruction to store the progress data to the remote server(s) 20 and the remote server(s) 20 may determine (942) the progress data corresponding to the third checkpoint and may store (944) the progress data on the remote server(s) 20. In some examples, the remote server(s) 20 may send a reference location or other pointer to the progress data (e.g., memory address on the remote server(s) 20) to the server(s) 120 and the server(s) 120 may store the reference location (e.g., in the association table).

After sending the instruction to store the progress data to the remote server(s) 20, the server(s) 120 may halt (916) the first process (e.g., end the first process) and may add (918) an identity of the first process to the list of processes associated with progress data, as discussed above with regard to FIG. 9A.

While FIG. 9B illustrates the server(s) 120 sending the instruction to store the progress data to the remote server(s) 20, the disclosure is not limited thereto. Instead, the remote server(s) 20 may automatically store the progress data without being instructed to by the server(s) 120 without departing from the disclosure. For example, the system 100 may perform the example method illustrated in FIG. 9B while omitting steps 940-944, as the remote server(s) 20 automatically store the progress data.

As illustrated in FIG. 9C, the remote server(s) 20 may operate (900) the first process, as discussed in greater detail above with regard to FIG. 8. The server(s) 120 may determine (908) to halt the first process. For example, the server(s) 120 may receive a voice command associated with a second process, may detect a timeout (e.g., no input to the device 110 for a period of time, such as 8 seconds), may receive a voice command instructing the server(s) 120 to end the first process, or the like. The server(s) 120 may determine (910) that the first process is capable of using progress data. For example, the first process may have a special flag or other indication that indicates to the server(s) 120 that the first process is capable of storing progress data and resuming from the stored progress data.

After determining to halt the first process and that the first process is capable of using progress data, the server(s) 120 may send (950) a request to the remote server(s) 20 for progress data associated with the first process. The remote server(s) 20 may determine (952) the progress data and may send (954) the progress data to the server(s) 120 so that the server(s) 120 may store (956) the progress data on the server(s) 120.

After storing the progress data, the server(s) 120 may halt (916) the first process (e.g., end the first process) and may add (918) an identity of the first process to the list of processes associated with progress data, as discussed above with regard to FIG. 9A.

As illustrated in FIG. 9D, the remote server(s) 20 may operate (900) the first process as discussed in greater detail above with regard to FIG. 8. The server(s) 120 may determine (908) to halt the first process. For example, the server(s) 120 may receive a voice command associated with a second process, may detect a timeout (e.g., no input to the device 110 for a period of time, such as 8 seconds), may receive a voice command instructing the server(s) 120 to end the first process, or the like. The server(s) 120 may determine (910) that the first process is capable of using progress data. For example, the first process may have a special flag or other indication that indicates to the server(s) 120 that the first process is capable of storing progress data and resuming from the stored progress data.

After determining to halt the first process and that the first process is capable of using progress data, the server(s) 120 may send (970) a request to the remote server(s) 20 for a checkpoint associated with the first process and may send (972) an instruction to store progress data corresponding to the checkpoint on the remote server(s) 20. The remote server(s) 20 may determine (974) the checkpoint, determine (976) the progress data corresponding to the checkpoint, store (978) the progress data on the remote server(s) 20 and may send (980) the checkpoint to the server(s) 120 so that the server(s) 120 may store (982) the checkpoint on the server(s) 120. In some examples, the remote server(s) 20 may send a reference location or other pointer to the progress data (e.g., memory address on the remote server(s) 20) to the server(s) 120 and the server(s) 120 may store the reference location (e.g., in the association table).

After storing the checkpoint, the server(s) 120 may halt (916) the first process (e.g., end the first process) and may add (918) the identity of the first process to the list of processes associated with progress data, as discussed above with regard to FIG. 9A.

Figure 10:
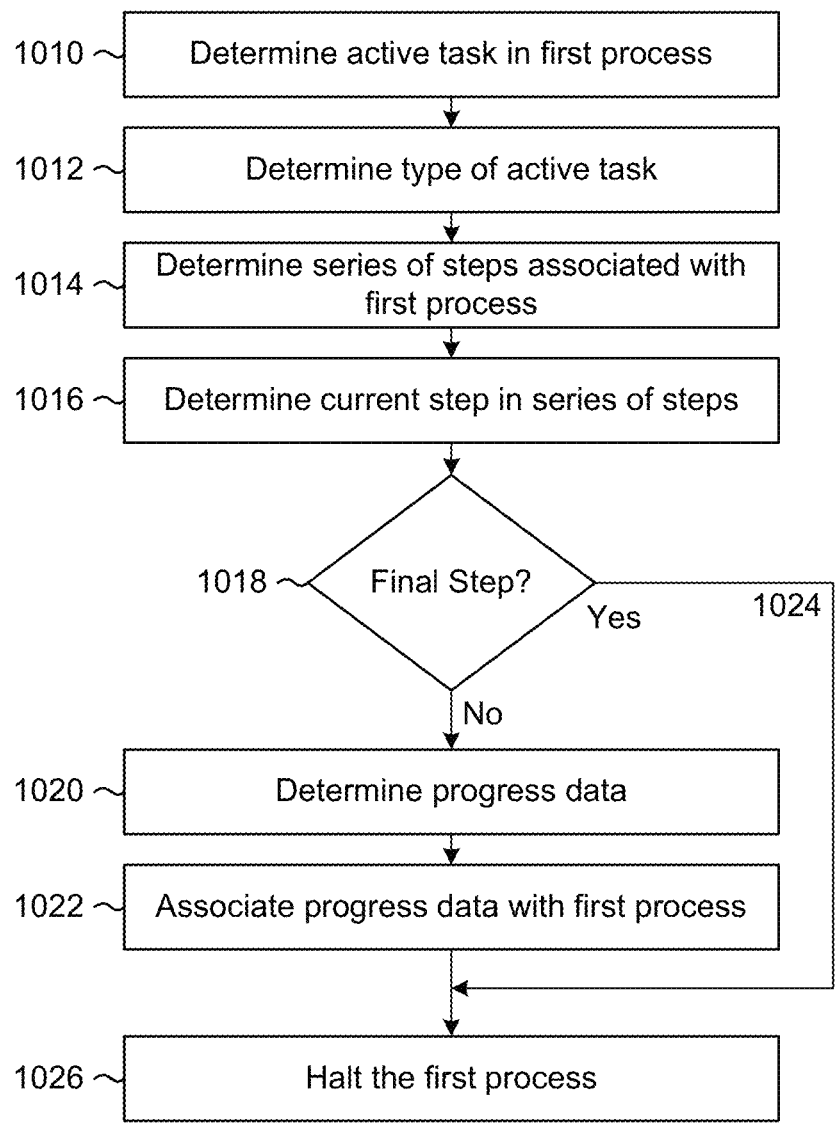
FIG. 10 is a flowchart conceptually illustrating an example method of determining to associate progress data with a process according to embodiments of the present disclosure.

FIG. 10 is a flowchart conceptually illustrating an example method of determining to associate progress data with a process according to embodiments of the present disclosure. As discussed above with regard to FIGS. 6A-6B, the server(s) 120 may determine whether to store progress data (e.g., to enable a process to resume from a current state) or whether to discard progress data (e.g., so that the process restarts from a beginning). One example method for determining whether to store progress data is illustrated in FIG. 10.

As illustrated in FIG. 10, the server(s) 120 may determine (10) an active task in a first process and determine (1012) a type of the active task. A process may have multiple different types of tasks and keeping track of the active task and the type of task may assist the system 100 in identifying and resuming the process at a later point in time. For example, processes may be associated with step-based tasks (e.g., reading a recipe in discrete steps), question and answer tasks (e.g., user asks a question of the process and/or the process asks a question of the user), general workflow tasks (e.g., bank account session) and/or other types of tasks. In some examples, the system 100 may receive a voice command instructing the system 100 to resume the active task without specifying what type of task, and the system 100 may resume the most recently performed task (e.g., select the first process to resume). However, the system 100 may receive a voice command indicating a type of task and the system 100 may interpret the voice command based on the type of task instead. For example, the most recent task may be a general workflow task (e.g., bank account session), but the voice command may specify "what is the next question." The system 100 may interpret the voice command to identify the most recent question and answer task instead of resuming the general workflow task. Similarly, the most recent task may be the question and answer task, but the voice command may specify "resume the recipe." The system 100 may interpret the voice command to identify the most recent step-based task (e.g., step two of the recipe) instead of resuming the question and answer task. Thus, storing the active task and the type of task enables the system 100 to refine what task the user intends to resume.

The server(s) 120 may determine (1014) a series of steps associated with the first process, determine (1016) a current step in the series of steps and determine (1018) whether the current step is a final step in the series of steps. If the current step is not the final step (e.g., there are additional steps after the current step), the server(s) 120 may determine (1020) progress data and associate (1022) the progress data with the first process. For example, If the current step is the final step (e.g., there are no more steps after the current step), the server(s) 120 may loop (1024) to step 1026 without determining the progress data or associating the progress data with the first process. The server(s) 120 may then halt (1026) the first process.

When the server(s) 120 store progress data associated with a first process, the server(s) 120 may resume functionality of the first process from the previous state. For example, if the user 10 inputs a voice command associated with the first process, the server(s) 120 may interpret the voice command, identify the first process, determine that the progress data is associated with the first process and may resume the first process using the progress data.

Figure 11:
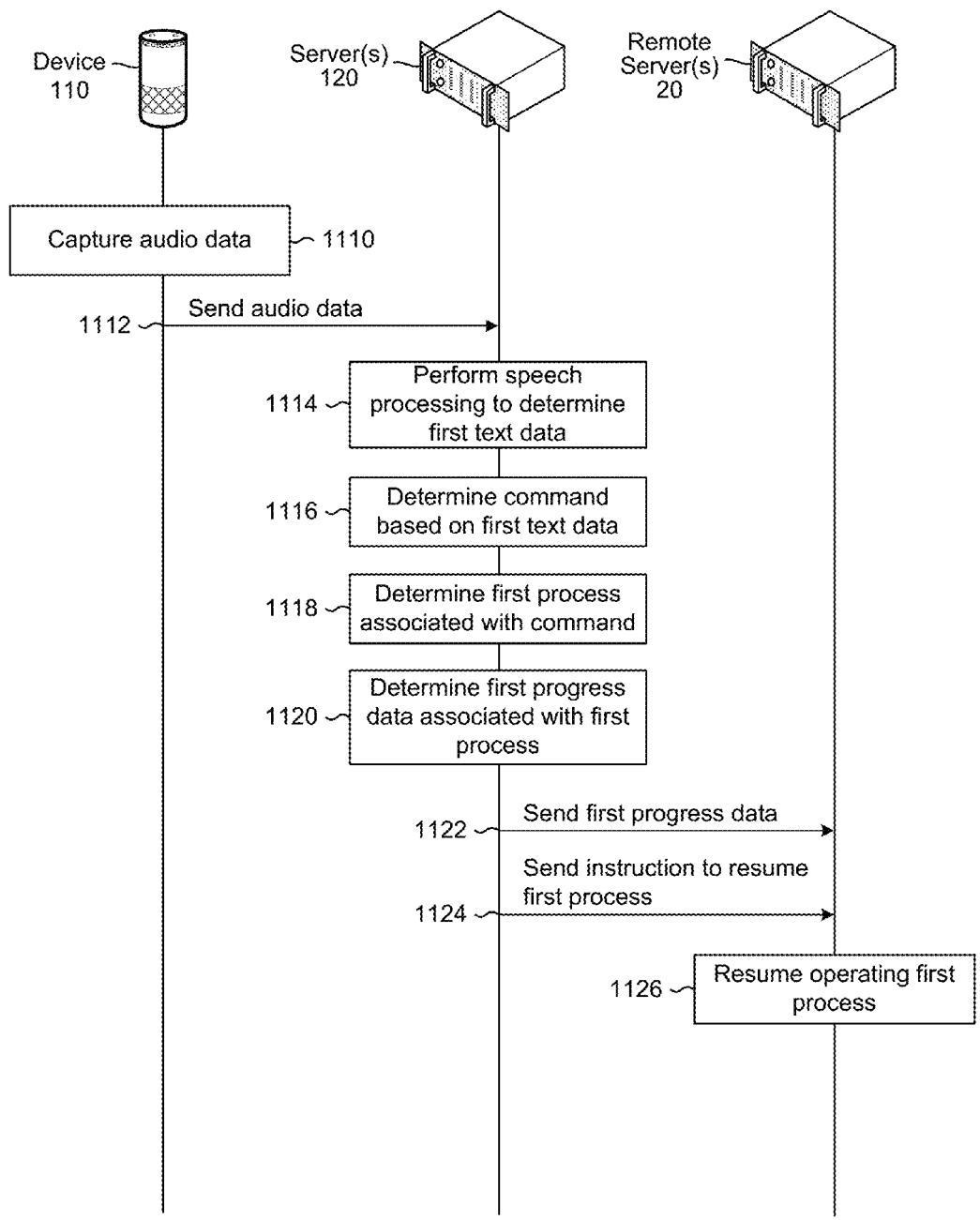
FIG. 11 is a communication diagram conceptually illustrating an example of resuming operation using progress data according to embodiments of the present disclosure.

FIG. 11 is a communication diagram conceptually illustrating an example of resuming operation using progress data according to embodiments of the present disclosure. As illustrated in FIG. 11, the device 110 may capture (1110) audio data using microphone(s) 112 on the device 110 and may send (1112) the audio data to the server(s) 120. The server(s) 120 may perform (1114) speech processing (e.g., Automatic Speech Recognition (ASR)) on the audio data to determine first text data, may determine (1116) a command based on the first text data (e.g., Natural Language Understanding (NLU) and/or Intent Classification (IC)) and may determine (1118) a first process associated with the command. As part of determining the first process, the server(s) 120 may determine remote server(s) 20 associated with the first process. After determining the first process, the server(s) 20 may determine (1120) first progress data (e.g., total progress data, checkpoint, reference location or other pointer corresponding to the total progress data, or the like) associated with the first process. For example, the server(s) 120 may identify the first process in the list of processes and/or an association table and may identify the first progress data. The server(s) 120 may send (1122) the first progress data to the remote server(s) 20 and may send (1124) an instruction to resume the first process using the first progress data to the remote server(s) 20.

If the first progress data is the total progress data, the remote server(s) 20 may simply load the total progress data to resume the first process. If the first progress data is a reference location or other pointer corresponding to the total progress data, the remote server(s) 20 may identify the total progress data and load the total progress data to resume the first process. However, if the first progress data is a checkpoint, the remote server(s) 20 may identify total progress data stored on the remote server(s) 20 using the checkpoint and additional data sent by the server(s) 120, such as an identity associated with the device 110, a user profile associated with the device 110, a session ID associated with the previous session or the like. The remote server(s) 20 may then load the total progress data and resume the first process.

Figure 12:
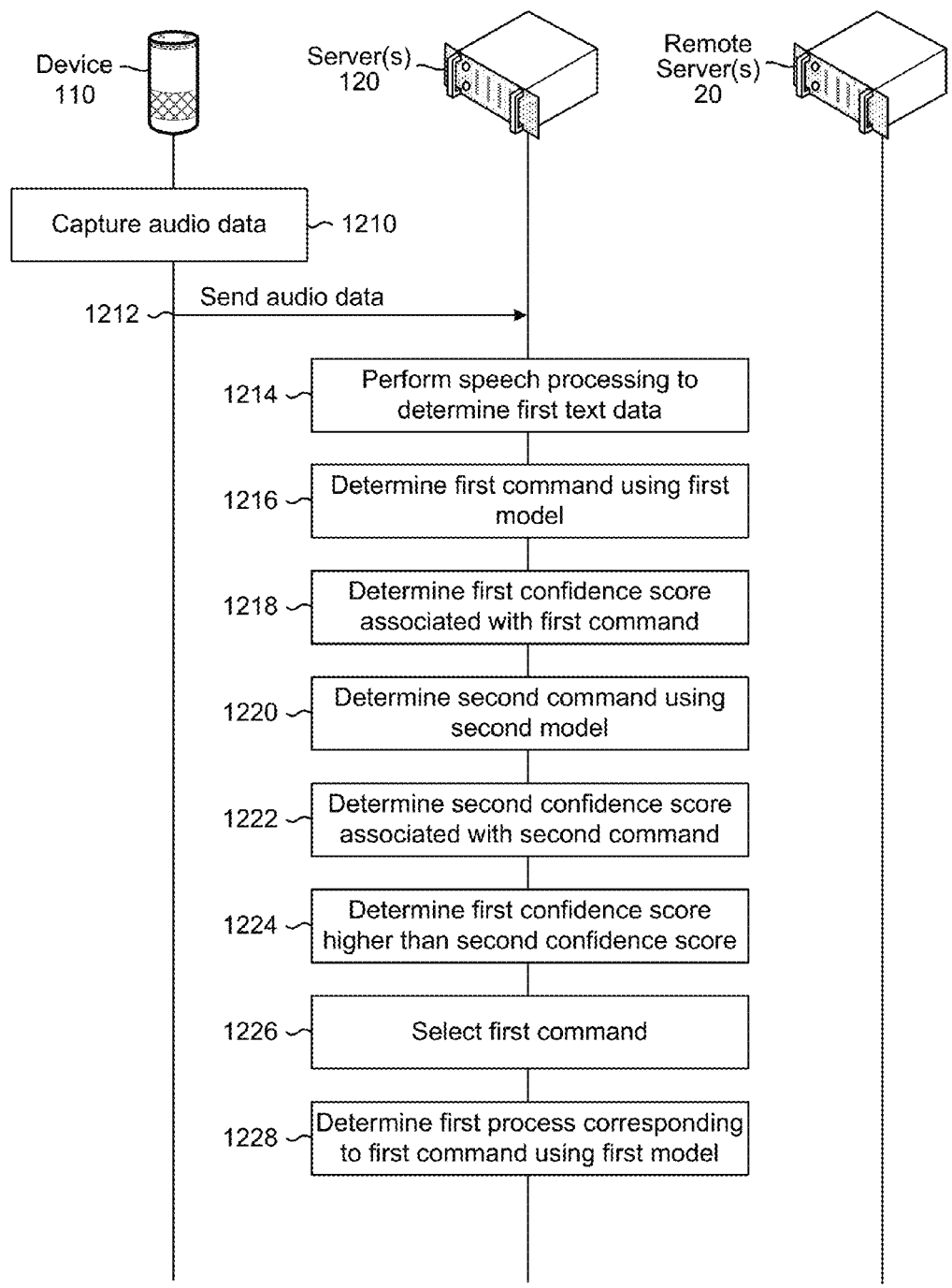
FIG. 12 is a communication diagram conceptually illustrating an example of determining a process associated with audio input according to embodiments of the present disclosure.
Figure 13:
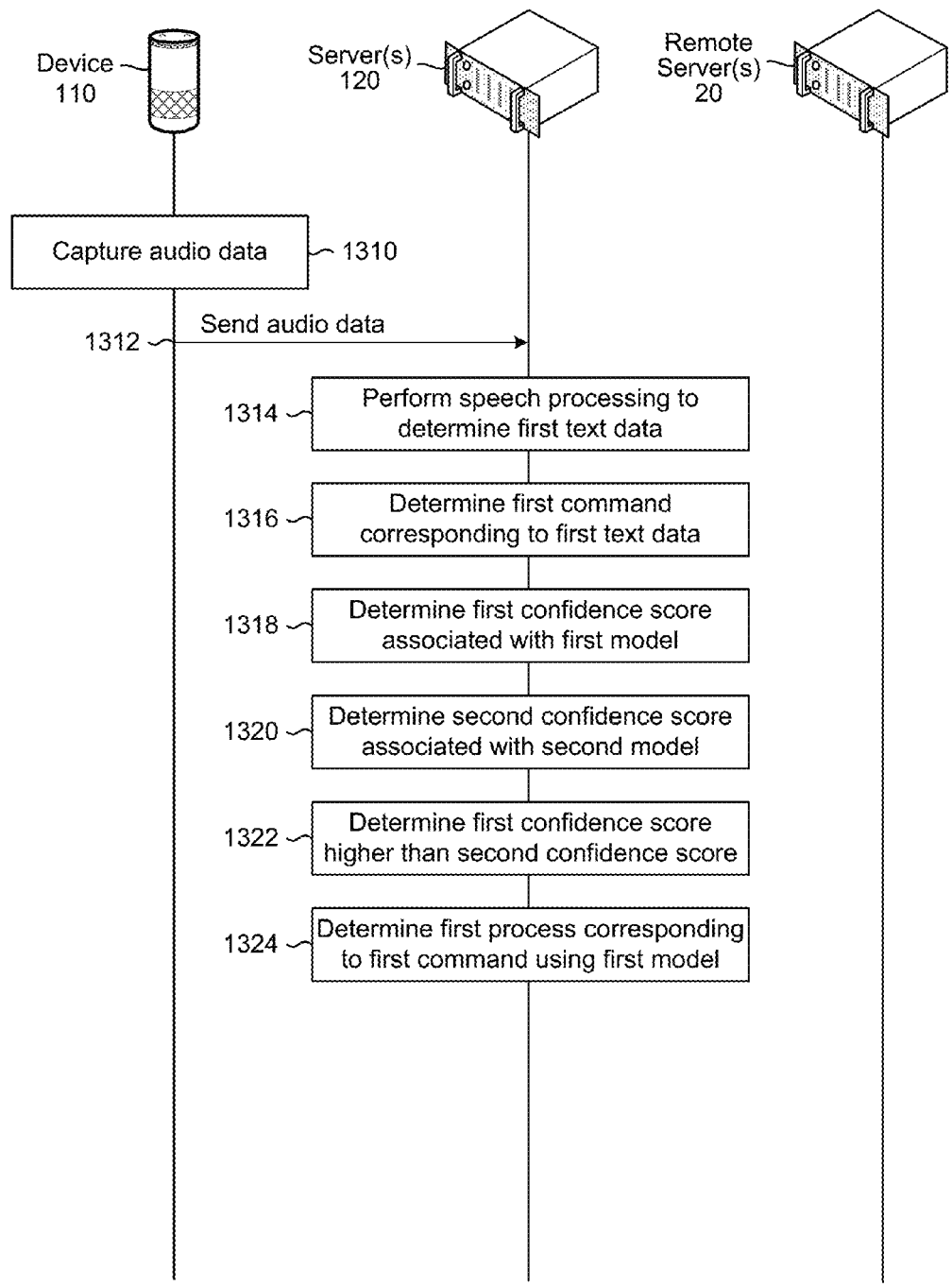
FIG. 13 is a communication diagram conceptually illustrating an example of determining a process associated with audio input according to embodiments of the present disclosure.
Figure 14:
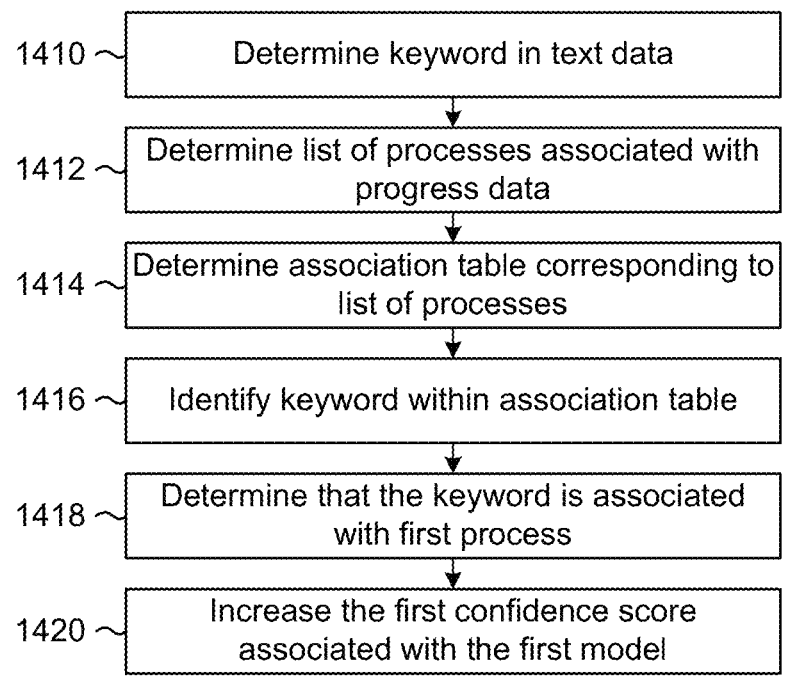
FIG. 14 is a flowchart conceptually illustrating an example method of identifying a keyword using an association table according to embodiments of the present disclosure.

As illustrated in FIGS. 12-14, the system 100 may interpret a voice command based on a list of processes that are associated with progress data. For example, when the system 100 halts a first process (e.g., a cookbook application), the system 100 may store progress data associated with the first process along with additional data (e.g., keywords associated with the first process, current state of the first process, identification of the first process, a human-readable name associated with the first process, a task and/or task type, a session identification, an expiration date associated with the progress data or the like) and may add the first process to the list of processes. When receiving the voice command (e.g., "resume the recipe"), the system 100 may identify a command associated with the list of processes (e.g., "resume"), determine that the first process is included in the list of processes, may identify the first process (e.g., using keywords such as "recipe") and may resume the first process using the progress data.

FIG. 12 is a communication diagram conceptually illustrating an example of determining a process associated with audio input according to embodiments of the present disclosure. As illustrated in FIG. 12, the device 110 may capture (1210) audio data using microphone(s) 112 on the device 110 and may send (1212) the audio data to the server(s) 120. The server(s) 120 may perform (1214) speech processing (e.g., Automatic Speech Recognition (ASR)) on the audio data to determine first text data.

The server(s) 120 may determine (1216) a first command based on the first text data using a first model and may determine (1218) a first confidence score associated with the first command. The first model may correspond to the list of processes that are associated with progress data and/or the association table, such that the server(s) 120 may analyze the first text data using the list of processes and/or the association table to determine the first command and the first confidence score. For example, the first text data may correspond to "resume the recipe" and the server(s) 120 may identify that the keyword "recipe" is associated with a first process that is included in the list of processes/association table. Additionally or alternatively, the server(s) 120 may determine that the keyword "resume" corresponds to a command associated with the list of processes/association table. Based on this, the server(s) 120 may determine that "resume the recipe" is the first command, which instructs the server(s) 120 to resume reading a previously halted recipe, and may determine the first confidence score associated with the first command.

In some examples, the server(s) 120 may generate a separate domain (e.g., resume-domain) that corresponds to the processes that are associated with progress data (e.g., the list of processes and/or the association table). As discussed above with regard to FIG. 2, a domain may represent a discrete set of activities having a common theme and may be associated with a particular language model and/or grammar database, a particular set of intents/actions, and a particular personalized lexicon. Each gazetteer may include domain-indexed lexical information associated with a particular user and/or device. For example, the resume-domain lexical information might include process IDs associated with processes included in the list of processes/association table, commands associated with the processes, keywords associated with the processes, current states of the processes, human-readable names associated with the processes, session IDs associated with the processes or the like. Thus, the server(s) 120 may determine the first command and the first confidence score using the new domain (e.g., resume-domain).

The server(s) 120 may determine (1220) a second command based on the first text data using a second model and may determine (1222) a second confidence score associated with the second command. While the first model may correspond to the list of processes/association table/resume-domain, the second model may correspond to other language models and/or domains. For example, the second model may correspond to other domains such as "shopping", "music", "calendaring", etc., and a music-domain lexical information might include album titles, artist names, and song names, for example, whereas a user's contact-list lexical information might include the names of contacts.

The server(s) 120 may determine (1224) that the first confidence score is higher than the second confidence score, may select (1226) the first command and may determine (1228) a first process corresponding to the first command using the first model. For example, the server(s) 120 may identify the first process corresponding to the first command included in the list of processes and/or the association table.

FIG. 13 is a communication diagram conceptually illustrating an example of determining a process associated with audio input according to embodiments of the present disclosure. As illustrated in FIG. 13, the device 110 may capture (1310) audio data using microphone(s) 112 on the device 110 and may send (1312) the audio data to the server(s) 120. The server(s) 120 may perform (1314) speech processing (e.g., Automatic Speech Recognition (ASR)) on the audio data to determine first text data and may determine (1316) a first command based on the first text data (e.g., Natural Language Understanding (NLU) and/or Intent Classification (IC)).

The server(s) 120 may determine (1318) a first confidence score associated with the first model, may determine (1320) a second confidence score associated with the second model, may determine (1322) that the first confidence score is higher than the second confidence score and may determine (1324) a first process corresponding to the first command using the first model (e.g., resume language model, resume-domain, etc.), as discussed above with regard to FIG. 12. Thus, the system 100 may use entity resolution to determine the highest confidence score between the first model and the second model and use the model having the highest confidence score (e.g., first model) to interpret the first text data.

Using the first model (e.g., resume language model, resume-domain, etc.), the system 100 may interpret the first text data differently depending on how the user phrased the query. For example, the system 100 may differentiate between an instruction to "resume" or "continue" (e.g., resume the most recent process), "resume AllRecipes" (e.g., resume the process associated with the name AllRecipes), "What's the next step" or "next step" (e.g., resume the most recent process that has a step-based task type as the active task), "continue making blueberry pie" or "resume making blueberry pie" (e.g., resume the process that has a task associated with the keywords "blueberry pie"), "start blueberry pie from the beginning" (e.g., restart the process associated with the keywords "blueberry pie"), "What is step two of blueberry pie?" (e.g., resume the process associated with the keywords "blueberry pie" from step two), etc. Thus, the system 100 may use entity resolution to determine the highest confidence score between different processes and select the process having the highest confidence score.

In some examples, the server(s) 120 may determine the first confidence score illustrated in FIGS. 12-13 by identifying keywords. FIG. 14 is a flowchart conceptually illustrating an example method of identifying a keyword using an association table according to embodiments of the present disclosure. As illustrated in FIG. 14, the server(s) 120 may determine (1410) a keyword in text data, may determine (1412) a list of processes associated with progress data, determine (1414) an association table corresponding to the list of processes, identify (1416) the keyword within the association table, determine (1418) that the keyword is associated with a first process and increase (1420) the first confidence score associated with the first model.

As illustrated in FIG. 15, devices 110 may contain components of the system 100 and may be connected over network(s) 10. The network(s) 10 may be a local or private network or may be part of a wider network. For example, the network(s) 10 may include a wired local area network (LAN), a wireless local area network (WLAN) (such as WiFi), Bluetooth, and/or wireless network, such as a Long Term Evolution (LTE) network, WiMAX network, 3G network, etc.

Devices 110 may be connected to the network(s) 10 through either wired or wireless connections. For example, a speech controlled device 110*a*, a headless device 110*b* connected to a television 1510, a tablet computer 110*c*, a smart phone 110*d*, a laptop computer 110*e*, and/or a smart television 110*f*, may be connected to the network(s) 10 through a wired and/or wireless connection. Thus, while the examples illustrated above are directed to the speech-controlled device 110*a*, the disclosure is not limited thereto and the device 110 may be any device capable of receiving voice input from a user.

While the examples described herein illustrate the device 110 performing multiple functions, the disclosure is not limited thereto. Instead, the server(s) 120 may perform any of the functions described herein without departing from the disclosure. For example, the server(s) 120 may assist the device 110 with Automatic Speech Recognition (ASR) processing, Natural Language Understanding (NLU) processing, command processing, generating and storing progress data and/or generating synthesized speech. A single server 120 may be capable of performing all speech processing or multiple server(s) 120 may combine to perform the speech processing. In addition, certain speech detection or command execution functions may be performed by device 110. Thus, the device 110 and/or the server(s) 120 may perform the functions described herein without departing from the disclosure.

Figure 16A:
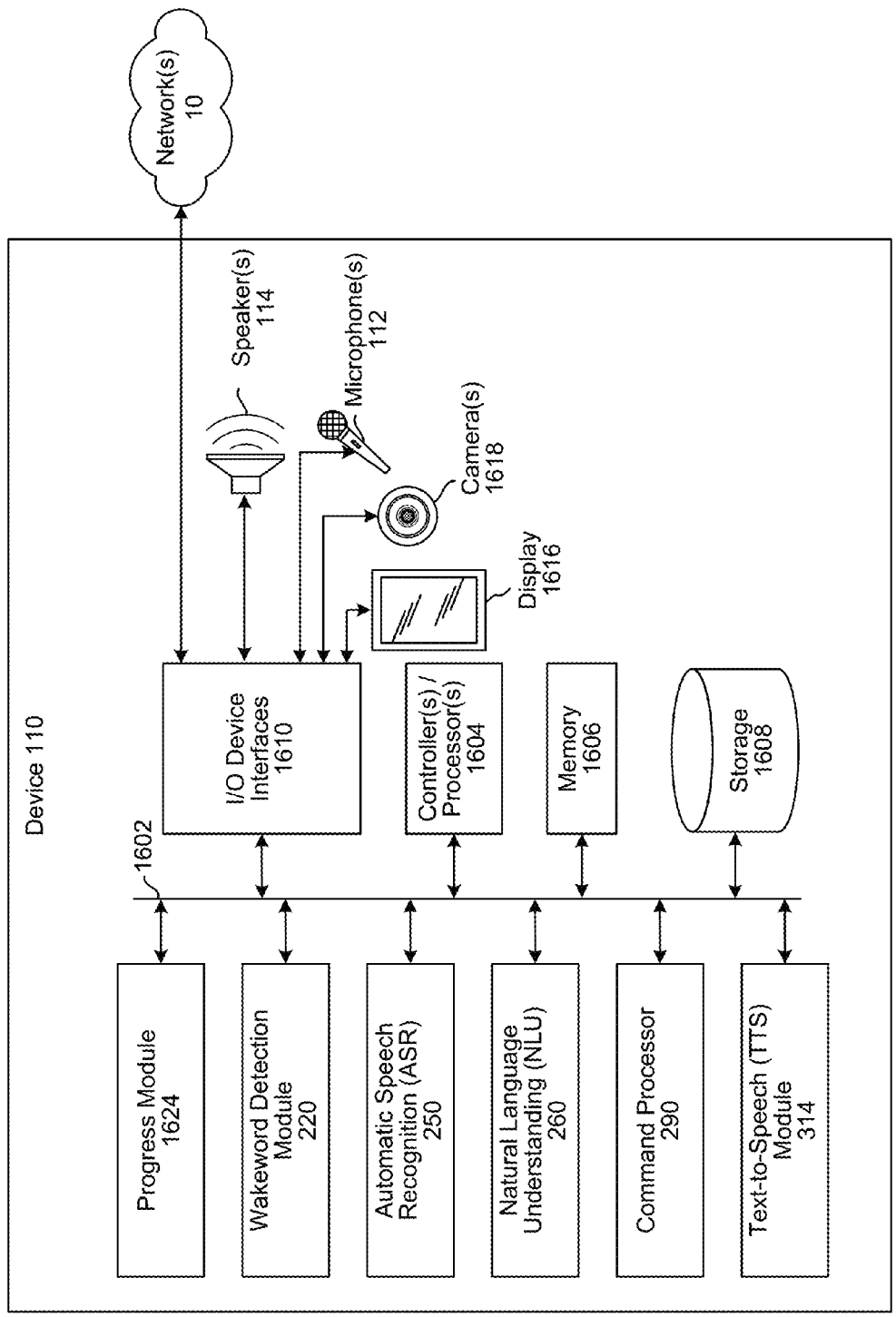

FIG. 16A is a block diagram conceptually illustrating a local device 110 that may be used with the described system 100. FIG. 16B is a block diagram conceptually illustrating example components of a remote device, such as a remote server(s) 120 that may assist with Automatic Speech Recognition (ASR), Natural Language Understanding (NLU) processing, command processing, generating and storing progress data and/or generating synthesized speech. Multiple such server(s) 120 may be included in the system, such as one server(s) 120 for ASR, one server(s) 120 for NLU, etc.

In operation, the system 100 may include computer-readable and computer-executable instructions that reside on the device 110 and/or server(s) 120, as will be discussed further below. The device 110 may be an electronic device capable of receiving voice commands and/or generating synthesized speech. Examples of electronic devices may include computers (e.g., a desktop, a laptop, a server or the like), portable devices (e.g., a camera (such as a 360° video camera, a security camera, a mounted camera, a portable camera or the like), smart phone, tablet or the like), media devices (e.g., televisions, video game consoles or the like) or the like. The device 110/server(s) 120 may also be a component of any of the abovementioned devices or systems.

As illustrated in FIGS. 16A-16B, the device 110/server(s) 120 may include an address/data bus 1602 for conveying data among components of the device 110/server(s) 120. Each component within the device 110/server(s) 120 may also be directly connected to other components in addition to (or instead of) being connected to other components across the bus 1602.

The device 110/server(s) 120 may include one or more controllers/processors 1604, that may each include a central processing unit (CPU) for processing data and computer-readable instructions, and a memory 1606 for storing data and instructions. The memory 1606 may include volatile random access memory (RAM), non-volatile read only memory (ROM), non-volatile magnetoresistive (MRAM) and/or other types of memory. The device 110/server(s) 120 may also include a data storage component 1608, for storing data and controller/processor-executable instructions (e.g., instructions to perform the algorithm illustrated in FIG. 1). The data storage component 1608 may include one or more non-volatile storage types such as magnetic storage, optical storage, solid-state storage, etc. The device 110/server(s) 120 may also be connected to removable or external non-volatile memory and/or storage (such as a removable memory card, memory key drive, networked storage, etc.) through the input/output device interfaces 1610.

The device 110/server(s) 120 includes input/output device interfaces 1610. A variety of components may be connected through the input/output device interfaces 1610, such as a microphone(s) 112, speakers 114, a display 1616 and/or camera(s) 1618 connected to the device 110. However, the disclosure is not limited thereto and the device 110 may not include integrated microphone(s) 112, speakers 114, display 1616 and/or camera(s) 1618. Thus, the microphone(s) 112, speakers 114, display 1616, camera(s) 1618 and/or other components may be integrated into the device 110 or may be separate from the device 110 without departing from the disclosure. In some examples, the device 110 may include an inertial measurement unit (IMU), gyroscope, accelerometers or other component configured to provide motion data or the like associated with the device 110. If an array of microphones 112 is included, approximate distance to a sound's point of origin may be performed acoustic localization based on time and amplitude differences between sounds captured by different microphones of the array. The device 110 (using microphone 112, wakeword detection module 220, ASR module 250, etc.) may be configured to determine audio data corresponding to detected audio. The device 110 (using input/output device interfaces 1610, etc.) may also be configured to transmit the audio data to server(s) 120 for further processing or to process the data using internal components such as a wakeword detection module 220.

The input/output device interfaces 1610 may be configured to operate with network(s) 10, for example a wireless local area network (WLAN) (such as WiFi), Bluetooth, ZigBee and/or wireless networks, such as a Long Term Evolution (LTE) network, WiMAX network, 3G network, etc. The network(s) 10 may include a local or private network or may include a wide network such as the internet. Devices may be connected to the network 1620 through either wired or wireless connections.

The input/output device interfaces 1610 may also include an interface for an external peripheral device connection such as universal serial bus (USB), FireWire, Thunderbolt, Ethernet port or other connection protocol that may connect to network(s) 10. The input/output device interfaces 1610 may also include a connection to an antenna (not shown) to connect one or more network(s) 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 110 and/or the server(s) 120 may include a wakeword detection module 220, an automatic speech recognition (ASR) 250, a natural language understanding (NLU) 260, a command processor 290 and/or a text-to-speech (TTS) module 314 as described above with regard to FIGS. 2-10.

The ASR module 250 in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server(s) 120 may include a limited or extended NLU module 260. The NLU module in device 110 may be of limited or extended capabilities. The NLU module 260 may comprise the name entity recognition module 262, the intent classification module 264 and/or other components. The NLU module 260 may also include a stored knowledge base and/or entity library, or those storages may be separately located.

The device 110 and/or server(s) 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 1608 may store data relating to keywords and functions to enable the wakeword detection module 220 to perform the algorithms and methods described above. The locally stored speech models may be preconfigured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 1608 and compare the captured audio to the stored models and audio sequences using audio comparison, pattern recognition, keyword spotting, audio signature, and/or other audio processing techniques.

In some examples, the device 110 may not include the ASR 250, the NLU 260, the command processor 290 and/or the TTS module 314. Instead, the server(s) 120 may include these components and may receive audio input, perform ASR/NLU on the audio input to determine a command, generate and store progress data and/or generate synthesized speech. Thus, the device 110 may receive data and/or instructions from the server(s) 120 to perform functionality associated with the ASR 250, the NLU 260, the command processor 290 and/or the TTS module 314. Additionally or alternatively, in some examples the server(s) 120 may not include the wakeword detection module 220.

The device 110/server(s) 120 further includes a progress module 1624, which may comprise processor-executable instructions stored in storage 1608 to be executed by controller(s)/processor(s) 1604 (e.g., software, firmware, hardware, or some combination thereof). For example, components of the progress module 1624 may be part of a software application running in the foreground and/or background on the device 110/server(s) 120. The progress module 1624 may control the device 110/server(s) 120 as discussed above, for example with regard to FIG. 1. Some or all of the controllers/modules of the progress module 1624 may be executable instructions that may be embedded in hardware or firmware in addition to, or instead of, software. In one embodiment, the device 110/server(s) 120 may operate using an Android operating system (such as Android 4.3 Jelly Bean, Android 4.4 KitKat or the like), an Amazon operating system (such as FireOS or the like), or any other suitable operating system.

Executable computer instructions for operating the device 110/server(s) 120 and its various components may be executed by the controller(s)/processor(s) 1604, using the memory 1606 as temporary "working" storage at runtime. The executable instructions may be stored in a non-transitory manner in non-volatile memory 1606, storage 1608, or an external device. Alternatively, some or all of the executable instructions may be embedded in hardware or firmware in addition to or instead of software.

The components of the device 110/server(s) 120, as illustrated in FIGS. 16A-16B, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for interpreting a voice command for a speech application, the method comprising:
    receiving, from a first device during a first time period, audio data corresponding to an utterance;
    performing speech recognition on the audio data to determine text data;
    determining a first command corresponding to the text data;
    determining a first word included in the first command;
    determining a list of applications that are associated with progress data, the list of applications including a first application;
    determining, using an association table corresponding to the list of applications, that the first word is associated with the first application;
    determining, using a first model corresponding to a first domain, a confidence score that the first command is associated with the first application;
    determining that the confidence score is above a threshold;
    determining, using the association table, first progress data associated with the first application, wherein the first progress data includes information about a first status of the first application during a previous session associated with the first application; and
    causing the first application to resume using the first progress data.

2. The computer-implemented method of claim 1, further comprising:
    determining, during a second time period before the first time period began, to halt the previous session associated with the first application;
    detecting an indicator indicating that the first application is capable of using progress data to represent a current status of the first application;
    determining the first progress data corresponding to the first application, wherein the first progress data includes information about the first status of the first application during the second time period, the first status corresponding to a current step in a series of steps associated with the first application;
    storing an association between the first progress data and an identity of the first application in the association table;
    adding the identity of the first application to the list of applications; and
    halting, during the second time period, the previous session associated with the first application.

3. The computer-implemented method of claim 1, wherein determining that the first word is associated with the first application further comprises:
    identifying the first word within the association table, the association table indicating at least two of an identity of the first application, an active task associated with the first application, a task type of the active task, a session identification associated with the previous session, keywords corresponding to the first application and information corresponding to the first progress data; and
    determining that the first word is included in the keywords corresponding to the first application.

4. The computer-implemented method of claim 1, further comprising:
    processing the text data with a second model to determine:
        a second command, and
        a second confidence score corresponding to the second command;
    processing the text data with the first model to determine:
        the first command, and
        a third confidence score corresponding to the third command;
    determining that the third confidence score is greater than the second confidence score;
    determining that the first command corresponds to the text data; and
    determining, based on the second model, the confidence score that the first command is associated with the first application.

5. A computer-implemented method, comprising:
    receiving, from a first device during a first time period, audio data corresponding to an utterance;
    performing speech recognition on the audio data to determine text data;
    determining a first command corresponding to the text data;
    determining a confidence score that the first command is associated with a first process, the first process included in a list of processes associated with progress data;
    determining that the confidence score is above a threshold;
    determining first progress data associated with the first process, wherein the first progress data includes information about a first status of the first process during a previous session associated with the first process; and
    causing the first process to resume based on the first progress data.

6. The computer-implemented method of claim 5, further comprising:

determining, during a second time period before the first time period began, to halt the previous session associated with the first process;
determining that the first process is capable of using progress data to represent a current status of the first process;
determining the first progress data corresponding to the first process, wherein the first progress data includes information about the first status of the first process during the second time period;
storing an association between the first progress data and an identity of the first process in a user profile associated with the first device;
adding the identity of the first process to the list of processes associated with progress data; and
halting, during the second time period, the previous session associated with the first process.

7. The computer-implemented method of claim 6, further comprising:
sending, during the second time period to a second device associated with the first process, a first request to create and store second progress data that corresponds to the first progress data;
sending, to the second device during the first time period, a second request to resume operating the first process based on the second progress data, the second request including the first progress data, the first progress data comprising at least one of a reference location or a current step of a series of steps associated with the first process.

8. The computer-implemented method of claim 6, further comprising:
sending, during the second time period to a second device associated with the first process, a first request to create and send the first progress data;
receiving the first progress data from the second device;
storing the first progress data; and
sending, to the second device during the first time period, a second request to resume operating the first process based on the first progress data, the second request including the first progress data.

9. The computer-implemented method of claim 5, further comprising:
processing the text data with a first model to determine:
a second command, and
a second confidence score corresponding to the second command;
processing the text data with a second model to determine:
the first command, and
a third confidence score corresponding to the third command;
determining that the third confidence score is greater than the second confidence score;
determining that the first command corresponds to the text data; and
determining, based on the second model, the confidence score that the first command is associated with the first process.

10. The computer-implemented method of claim 5, further comprising:
performing the speech recognition on the audio data using a first model to determine the text data;
determining a second confidence score that the text data corresponds to the audio data;
performing second speech recognition on the audio data using a second model to determine second text data;
determining a third confidence score that the second text data corresponds to the audio data;
determining that the second confidence score is greater than the third confidence score;
determining, based on the first model, the first command corresponding to the text data; and
determining, based on the first model, the confidence score that the first command is associated with the first process.

11. The computer-implemented method of claim 5, further comprising:
identifying a user profile associated with the text data; and
identifying, within the user profile, an indication that the first process is associated with the first progress data, wherein the confidence score is increased due to identifying the indication.

12. The computer-implemented method of claim 5, further comprising:
determining a first word included in the first command;
identifying the first word within an association table corresponding to the list of processes, the association table indicating at least two of an identity of the first process, an active task associated with the first process, a task type of the active task, a session identification associated with the previous session, keywords corresponding to the first process and information corresponding to the first progress data; and
determining that the first word is associated with the first process, wherein the confidence score is increased due to the first word being associated with the first process.

13. A device, comprising:
at least one processor;
a memory device including instructions operable to be executed by the at least one processor to configure the device to:
receive, from a first device during a first time period, audio data corresponding to an utterance;
perform speech recognition on the audio data to determine text data;
determine a first command corresponding to the text data;
determine a confidence score that the first command is associated with a first process, the first process included in a list of processes associated with progress data;
determine that the confidence score is above a threshold;
determine first progress data associated with the first process, wherein the first progress data includes information about a first status of the first process during a previous session associated with the first process; and
cause the first process to resume based on the first progress data.

14. The system of claim 13, wherein the instructions further configure the system to:
determine, during a second time period before the first time period began, to halt the previous session associated with the first process;
determine that the first process is capable of using progress data to represent a current status of the first process;
determine the first progress data corresponding to the first process, wherein the first progress data includes information about the first status of the first process during the second time period;

store an association between the first progress data and an identity of the first process in a user profile associated with the first device;

add the identity of the first process to the list of processes associated with progress data; and halt, during the second time period, the previous session associated with the first process.

15. The system of claim 14, wherein the instructions further configure the system to:

send, during the second time period to a second device associated with the first process, a first request to create and store second progress data that corresponds to the first progress data;

send, to the second device during the first time period, a second request to resume operating the first process based on the second progress data, the second request including the first progress data, the first progress data comprising at least one of a reference location or a current step of a series of steps associated with the first process.

16. The system of claim 14, wherein the instructions further configure the system to:

send, during the second time period to a second device associated with the first process, a first request to create and send the first progress data;

receive the first progress data from the second device;

store the first progress data;

send, to the second device during the first time period, a second request to resume operating the first process based on the first progress data, the second request including the first progress data.

17. The system of claim 13, wherein the instructions further configure the system to:

process the text data with a first model to determine:
  a second command, and
  a second confidence score corresponding to the second command;

process the text data with a second model to determine:
  the first command, and
  a third confidence score corresponding to the third command;

determine that the third confidence score is greater than the second confidence score;

determine that the first command corresponds to the text data; and determine, based on the second model, the confidence score that the first command is associated with the first process.

18. The system of claim 13, wherein the instructions further configure the system to:

perform the speech recognition on the audio data using a first model to determine the text data;

determine a second confidence score that the text data corresponds to the audio data;

perform second speech recognition on the audio data using a second model to determine second text data;

determine a third confidence score that the second text data corresponds to the audio data;

determine that the second confidence score is greater than the third confidence score;

determine, based on the first model, the first command corresponding to the text data; and determine, based on the first model, the confidence score that the first command is associated with the first process.

19. The system of claim 13, wherein the instructions further configure the system to:

identify a user profile associated with the text data; and identify, within the user profile, an indication that the first process is associated with the first progress data, wherein the confidence score is increased due to identifying the indication.

20. The system of claim 13, wherein the instructions further configure the system to:

determine a first word included in the first command;

identify the first word within an association table corresponding to the list of processes, the association table indicating at least two of an identity of the first process, an active task associated with the first process, a task type of the active task, a session identification associated with the previous session, keywords corresponding to the first process and information corresponding to the first progress data; and determine that the first word is associated with the first process, wherein the confidence score is increased due to the first word being associated with the first process.

* * * * *